United States Patent
Almatrafi et al.

(10) Patent No.: US 11,311,818 B1
(45) Date of Patent: Apr. 26, 2022

(54) BRAYTON CYCLE ADSORPTION DESALINATION SYSTEM

(71) Applicant: King Abdulaziz University, Jeddah (SA)

(72) Inventors: Eydhah Almatrafi, Makkah (SA); Arunkumar Narasimhan, Tamil Nadu (IN); Rajeev Kamal, Bryan, TX (US)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/487,252

(22) Filed: Sep. 28, 2021

(51) Int. Cl.
| | |
|---|---|
| *B01D 1/00* | (2006.01) |
| *B01D 5/00* | (2006.01) |
| *B01D 1/22* | (2006.01) |
| *C02F 1/04* | (2006.01) |
| *B01D 53/04* | (2006.01) |
| *F02C 1/05* | (2006.01) |
| *C02F 103/08* | (2006.01) |

(52) U.S. Cl.
CPC .......... *B01D 1/0047* (2013.01); *B01D 1/222* (2013.01); *B01D 5/006* (2013.01); *B01D 5/0087* (2013.01); *B01D 53/0407* (2013.01); *C02F 1/048* (2013.01); *F02C 1/05* (2013.01); *B01D 2253/106* (2013.01); *B01D 2257/80* (2013.01); *B01D 2259/402* (2013.01); *B01D 2259/40003* (2013.01); *B01D 2259/40088* (2013.01); *C02F 2103/08* (2013.01); *C02F 2303/10* (2013.01)

(58) Field of Classification Search
CPC ... B01D 1/00; B01D 5/00; B01D 1/22; B01D 53/04; C02F 1/04; F02C 1/05
See application file for complete search history.

(56) References Cited

U.S. PATENT DOCUMENTS

| | | | |
|---|---|---|---|
| 9,500,185 B2 | 11/2016 | Al-Sulaiman | |
| 10,053,374 B2 * | 8/2018 | Li | .......... B01D 3/145 |
| 10,907,510 B2 | 2/2021 | Larochelle et al. | |

(Continued)

FOREIGN PATENT DOCUMENTS

| | | | | | |
|---|---|---|---|---|---|
| CN | 102966497 A | * | 3/2013 | ................ | C02F 1/14 |
| CN | 110344898 A | * | 10/2019 | ................ | F03G 6/06 |

(Continued)

OTHER PUBLICATIONS

CN-102966497-A_English Translation (Year: 2013).*

(Continued)

*Primary Examiner* — Youngsul Jeong
(74) *Attorney, Agent, or Firm* — Oblon, McClelland, Maier & Neustadt, L.L.P.

(57) ABSTRACT

A Brayton cycle adsorption desalination system includes an adsorption desalination system including an evaporator for evaporating saline water to obtain water vapor, an adsorbent bed for adsorbing and desorbing the water vapor, and a condenser for condensing the water vapor to obtain distilled water. The Brayton cycle adsorption desalination system further includes a Brayton cycle system including a primary heat exchanger (PHE) and a cooler configured to cool an exhaust from the PHE. The Brayton cycle system and the adsorption desalination system are connected at the PHE so that the PHE is configured to function as a heat source for the adsorbent bed. The Brayton cycle system and the adsorption desalination system are connected at the cooler so that the evaporator is configured to absorb heat rejected from the cooler.

11 Claims, 19 Drawing Sheets

(56) References Cited

U.S. PATENT DOCUMENTS

2004/0237526 A1* 12/2004 Strobl ................. F02C 1/10
　　　　　　　　　　　　　　　　　60/649
2016/0047361 A1* 2/2016 Al-Sulaiman ........... F01K 23/10
　　　　　　　　　　　　　　　　　60/641.15

FOREIGN PATENT DOCUMENTS

| CN | 210217850 U  | 3/2020 |
| CN | 112249293 A  | 1/2021 |
| CN | 112627925 A  | 4/2021 |

OTHER PUBLICATIONS

CN110344898A_English Translation (Year: 2013).*

Mohamed L. Elsayed, et al., "Utilization of waste heat from a commercial GT for freshwater production, cooling and additional power: Exergoeconomic analysis and optimization", Desalination, vol. 513, Oct. 1, 2021, 3 pages (Abstract only).

Maghsoud Abdollahi Haghghi, et al., "Thermodynamic, exergoeconomic, and environmental evaluation of a new multi-generation system driven by a molten carbonate fuel cell for production of cooling, heating, electricity, and freshwater", Energy Conversion and Management, vol. 199, Nov. 1, 2019, 3 pages (Abstract only).

Haihua Zhao, et al., "Advanced Multi-Effect Distillation System for Desalination Using Waste Heat fromGas Brayton Cycles", Journal Article, vol. 180, Issue 3, Oct. 1, 2012, 3 pages (Abstract only).

Kyaw Thu, et al., "Performance investigation of advanced adsorption desalination cycle with condenser—evaporator heat recovery scheme", Desalination and Water Treatment, vol. 51, Issue 1-3, 2013, pp. 150-163.

Arunkumar Narasimhan, et al., "Novel synergetic integration of supercritical carbon dioxide Brayton cycle and adsorption desalination", Energy, vol. 238, Part B, Jan. 2022, pp. 1-17.

* cited by examiner

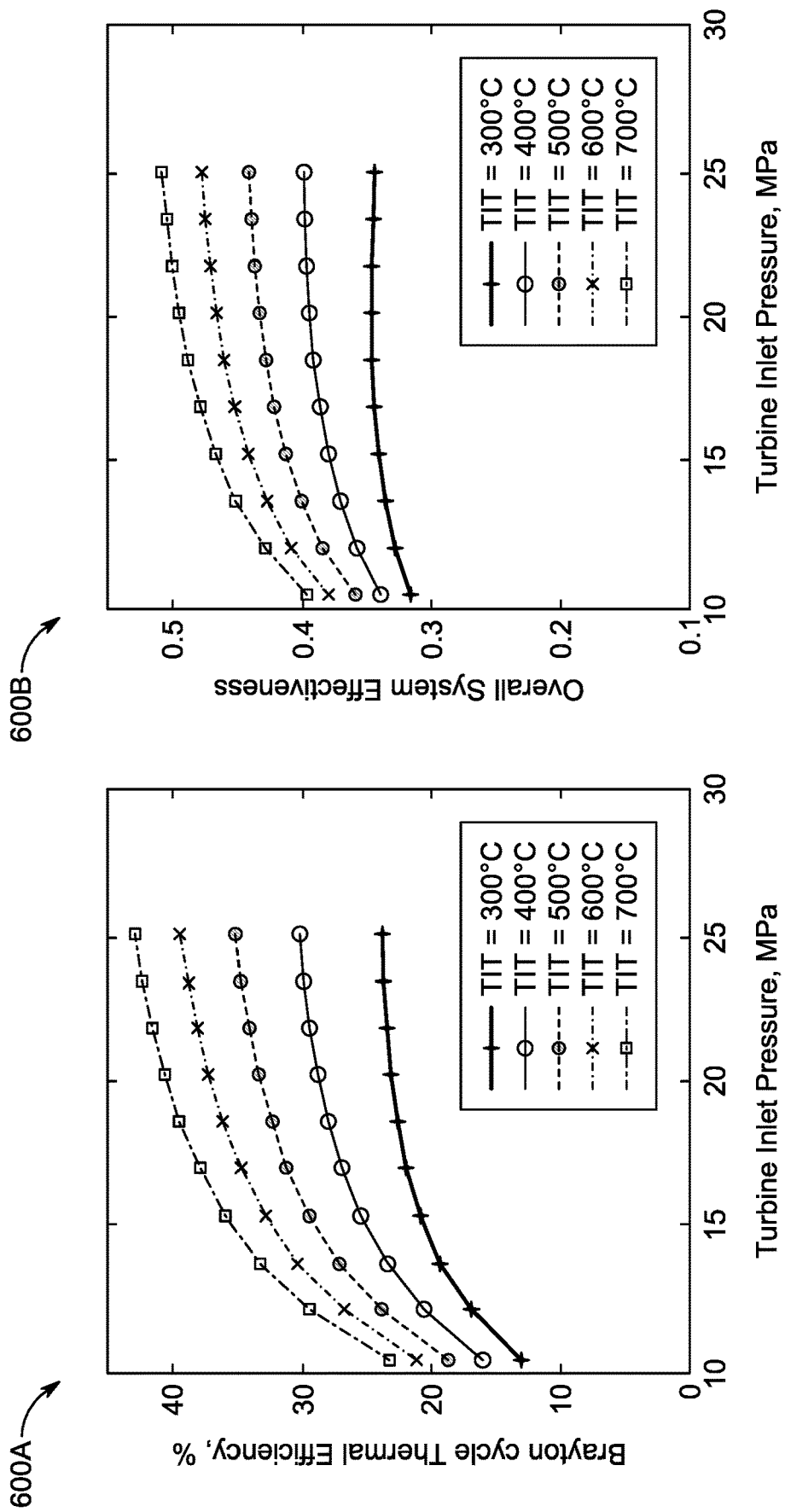

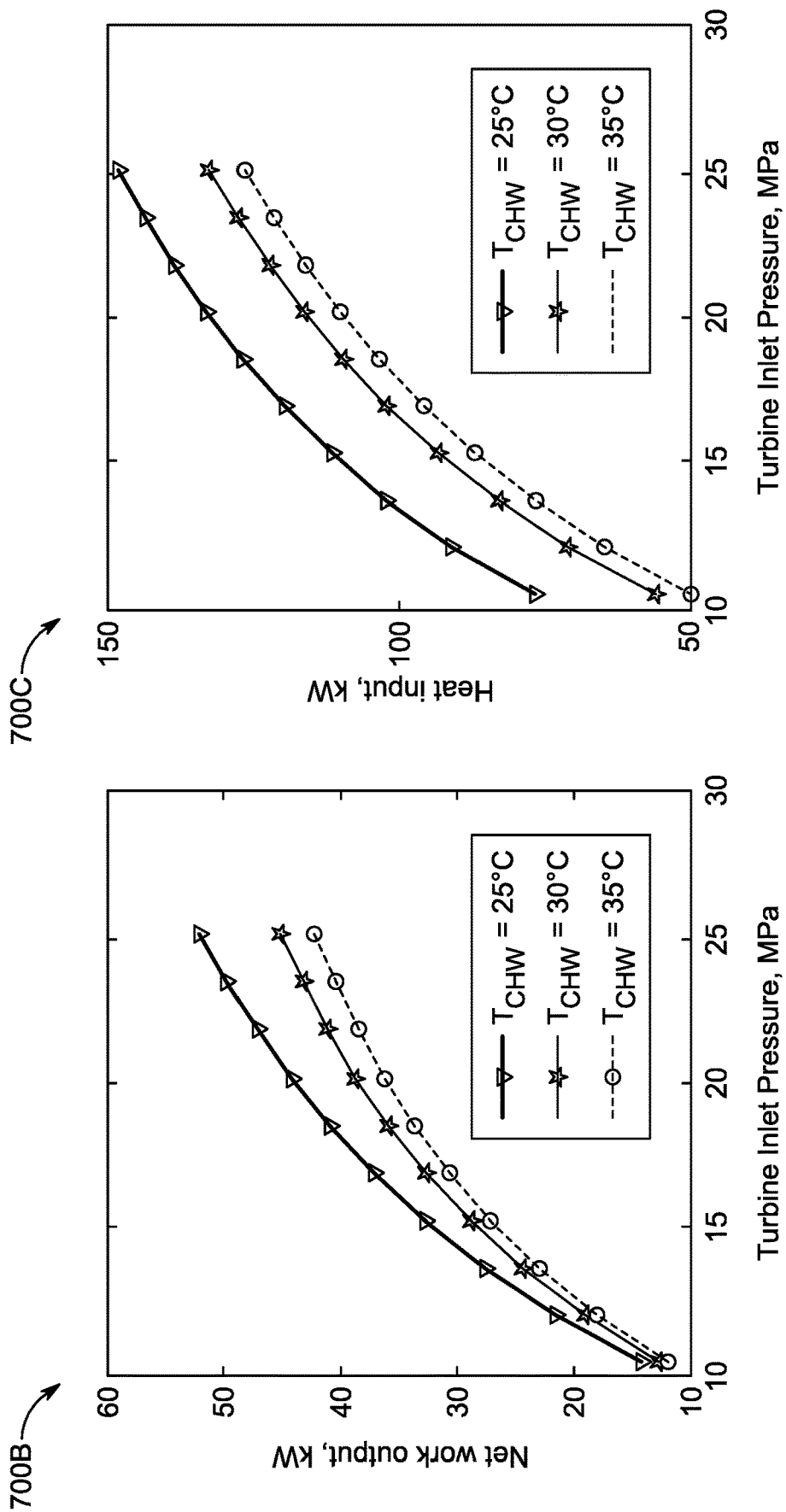

BRAYTON CYCLE ADSORPTION DESALINATION SYSTEM

STATEMENT OF ACKNOWLEDGEMENT

The inventors extend their appreciation to the Deputyship for Research and Innovation, Ministry of Education in Saudi Arabia for funding this research work through the project number 2021-071 and King Abdulaziz University, DSR, Jeddah, Saudi Arabia.

BACKGROUND

Technical Field

The present disclosure is directed generally to desalination and energy generation and more specifically to a Brayton cycle adsorption desalination system including a Brayton cycle system and an adsorption desalination system, and a co-generation method for concurrent desalination and energy generation.

Description of Related Art

Freshwater production and supply is essential for social and economic development. Due to the scarcity of fresh water, desalination of sea water and saline water has become a necessity for sustainable development and better quality of life. Desalination systems are broadly classified into thermal and membrane-based technologies. Conventional thermal-based technologies such as multi-effect distillation (MED) and multi-stage flash distillation (MSF) are energy-intensive and are typically integrated with utility scale power plants to utilize the industrial waste heat. Integrating power production and desalination plants could help meet the demands for both electricity and fresh water, especially in rural areas of tropical countries, thereby improving the socio-economic conditions of those regions.

Some researchers have studied the integration of thermal-based desalination technologies with solar or other modes of power generation systems in a topping-bottoming configuration. Commonly investigated topping-bottoming configurations, including Supercritical Recompression Brayton Cycle (SRBC) and Supercritical Regeneration Brayton Cycle (SRGBC), have mainly focused on integration of MED with a topping cycle to recover the waste heat at the turbine exit. However, there are a few drawbacks in utilizing MED for decentralized co-generation applications, such as (i) higher specific thermal energy consumption; (ii) non-feasibility with a low-temperature heat source (<100° C.) such as industrial waste heat or small-scale solar power in rural areas; (iii) scaling issues due to evaporation at high temperatures leading to high maintenance cost; (iv) power cycle performance penalty due to MED's high energy consumption. With a low-grade heat source in small-scale power generation and high sink temperatures, MED could impact the power cycle performance due to its high specific thermal energy consumption. Furthermore, most of the literature assumes an ambient temperature of 25° C., which is impractical in tropical climates, especially in the summer. There have been other attempts to integrate power generation systems with desalination systems.

For instance, CN112249293A discloses a ship nuclear power system including a high temperature gas cooled reactor system having a reactor and two heat exchangers, a supercritical $CO_2$ ($SCO_2$) power circulating system, and a sea water desalination system. The $SCO_2$ power circulating system is coupled with the high temperature gas cooled reactor system through the two heat exchangers. The high temperature gas cooled reactor system is coupled with the sea water desalination system through two coolers.

CN112627925A discloses a flexible power station including a heat source circulating system, a thermal power circulating system, a sea water desalination system and a control system. While the Brayton cycle may be used in this flexible power station, the heat source circulating system includes a boiler which provides heat for both the thermal power circulating system and the sea water desalination system.

CN210217850U discloses a power generation system including an $SCO_2$ power generation sub-system and a seawater distillation subsystem. The $SCO_2$ power generation sub-system includes two compressors, two regenerators (i.e., heat exchangers) and two coolers (one for high temperature, the other one for low temperature for all three components). The seawater distillation subsystem includes a first-effect evaporator, a second-effect evaporator and a third-effect evaporator.

U.S. Pat. No. 9,500,185B2 discloses a solar thermal energy generation system, including a solar receiver, a first energy generation system in the form of a supercritical Brayton cycle, and a second energy generation system. The first energy generation system includes two compressors, two turbines, two thermal recuperators. While the second energy generation system could be a water desalination system, the second energy generation system includes two turbines and two thermal recuperators. Furthermore, in this reference, the second energy generation system does not seem to provide cooling for the first energy generation system.

U.S. Ser. No. 10/907,510B2 discloses a system, such as a Brayton cycle system. The Brayton cycle system may provide heat for thermal desalination. Additionally, in this reference, heat is harvested by a cold side thermal storage medium, a hot side thermal storage medium and their flowing paths for applications such as thermal desalination.

Elsayed et al. [Utilization of waste heat from a commercial GT for freshwater production, cooling and additional power: Exergoeconomic analysis and optimization, incorporated herein by reference in its entirety] studied a multi-generation system for power, cooling and freshwater production. The waste heat from a SIEMENS SGT6-2000E GT is utilized to drive a $SCO_2$ recompression Brayton cycle (SCRBC) and multi-effect desalination (MED) with a thermal vapor compressor (TVC), while the waste heat from the pre-cooler of the SCRBC is utilized to drive an absorption cooling cycle.

Zhao et al. [Advanced Multi-Effect Distillation System for Desalination Using Waste Heat from Gas Brayton Cycles, incorporated herein by reference in its entirety] studied an Advanced Multi-Effect Distillation design that uses waste heat from closed gas Brayton cycles. This design does not seem to provide cooling for Brayton cycles using the distillation process.

Each of the aforementioned references suffers from one or more drawbacks hindering their adoption, as described above. Accordingly, it is an object of the present disclosure to provide systems and methods for a less energy-intensive adsorption desalination using synergetic integration with Brayton cycle, with the Brayton cycle providing a heat source for the adsorption desalination and the adsorption desalination providing the cooling required in a cooler of the Brayton cycle.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

In an exemplary embodiment, a Brayton cycle adsorption desalination system is described. The Brayton cycle adsorption desalination system includes an adsorption desalination system including an evaporator for evaporating saline water to obtain water vapor, an adsorbent bed for adsorbing and desorbing the water vapor, and a condenser for condensing the water vapor to obtain distilled water. The Brayton cycle adsorption desalination system further includes a Brayton cycle system including a primary heat exchanger (PHE) and a cooler configured to cool an exhaust from the PHE. The Brayton cycle system and the adsorption desalination system are connected at the PHE so that the PHE is configured to function as a heat source for the adsorbent bed. The Brayton cycle system and the adsorption desalination system are connected at the cooler so that the evaporator is configured to absorb heat rejected from the cooler.

In some embodiments, the Brayton cycle system further includes a compressor that compresses a working fluid from a low pressure to a high pressure to obtain a compressed working fluid, a recuperator that pre-heats the compressed working fluid to obtain a pre-heated working fluid, a heater that heats the pre-heated working fluid to obtain a heated working fluid, and a turbine through which the heated working fluid passes such that the heated working fluid expands to output work and obtain an expanded working fluid. The expanded working fluid passes through the PHE to obtain the exhaust.

In some embodiments, the compressor, the recuperator, the heater, the turbine, the PHE, and the cooler are configured to define a closed path cycle for the working fluid. An outlet of the compressor is connected to a first inlet of the recuperator. A first outlet of the recuperator is connected to an inlet of the heater. An outlet of the heater is connected to an inlet of the turbine. An outlet of the turbine is connected to an inlet of the PHE. An outlet of the PHE is connected to a second inlet of the recuperator. A second outlet of the recuperator is connected to an inlet of the cooler. An outlet of the cooler is connected to an inlet of the compressor.

In some embodiments, the recuperator includes a heat exchanger for the working fluid from the compressor and the exhaust from the PHE to exchange heat.

In some embodiments, the adsorption desalination system includes two or more adsorbent beds that operate in an alternate sequence of adsorption and desorption modes, and a switching valve configured to control the alternate sequence of adsorption and desorption modes.

In some embodiments, the Brayton cycle adsorption desalination system further includes a storage tank such that the storage tank, the PHE and the adsorbent bed are configured to define a closed path cycle for a heat transfer medium. An outlet of the storage tank is connected to an inlet of the PHE. An outlet of the PHE is connected to an inlet of the adsorbent bed. An outlet of the adsorbent bed is connected to an inlet of the storage tank.

In some embodiments, the PHE and the adsorbent bed are in direct contact for heat exchange.

In some embodiments, the Brayton cycle adsorption desalination system further includes a coolant storage tank such that the coolant storage tank, the cooler and the evaporator are configured to define a closed path cycle for a coolant. An outlet of the coolant storage tank is connected to an inlet of the cooler. An outlet of the cooler is connected to an inlet of the evaporator. An outlet of the evaporator is connected to an inlet of the coolant storage tank.

In some embodiments, the evaporator and the cooler are in direct contact for heat exchange.

In some embodiments, the working fluid includes supercritical carbon dioxide. In some embodiments, the adsorbent bed includes silica gel for adsorbing and desorbing water vapor.

In another exemplary embodiment, a co-generation method for concurrent desalination and energy generation is described. The co-generation method includes recovering latent heat of saline water evaporation while evaporating saline water to obtain water vapor in an evaporator of an adsorption desalination (AD) system. Herein, the latent heat recovered is configured to provide cooling for a cooler of a Brayton cycle system. The co-generation method further includes adsorbing the water vapor onto an adsorbent bed of the AD system. The co-generation method further includes desorbing the water vapor from the adsorbent bed using heat from a primary heat exchanger (PHE) of the Brayton cycle system. The co-generation method further includes condensing the water vapor in a condenser of the AD system to obtain distilled water.

In some embodiments, the co-generation method further includes circulating a working fluid in a closed cycle path through, in sequence, a compressor of the Brayton cycle system, a recuperator of the Brayton cycle system, a heater of the Brayton cycle system, a turbine of the Brayton cycle system, the PHE, the recuperator and the cooler In some embodiments, the co-generation method further includes compressing the working fluid from a low pressure to a high pressure in the compressor. The co-generation method also includes pre-heating the working fluid in the recuperator to obtain a pre-heated working fluid. The co-generation method also includes heating the pre-heated working fluid in the heater to obtain a heated working fluid. The co-generation method also includes outputting work using the turbine by passing the heated working fluid through the turbine such that the heated working fluid expands to output the work and obtain an expanded working fluid. The co-generation method also includes passing the expanded working fluid through the PHE to obtain an exhaust. The co-generation method also includes pre-cooling the exhaust in the recuperator by bringing the exhaust from the PHE into thermal contact with the working fluid from the compressor. The co-generation method also includes cooling the exhaust in the cooler.

In some embodiments, the co-generation method further includes operating a first adsorbent bed and a second adsorbent bed of the AD system in an alternate sequence of adsorption and desorption modes in a single stage by during a first half of a cycle, operating the first adsorbent bed in an adsorption mode while operating the second adsorbent bed in a desorption mode; during a second half of the cycle, operating the first adsorbent bed in the desorption mode while operating the second adsorbent bed in the adsorption mode; and during the cycle, operating the evaporator and the condenser continuously while connecting the evaporator and the condenser to at least one of the first adsorbent bed or the second adsorbent bed.

In some embodiments, the co-generation method further includes desorbing the water vapor from the adsorbent bed using the heat from the PHE by using a heat transfer medium to transfer heat from the PHE to the adsorbent bed.

In some embodiments, the co-generation method further includes circulating the heat transfer medium in a closed cycle path through, in sequence, a heat transfer medium tank, the PHE and the adsorbent bed.

In some embodiments, the co-generation method further includes recovering the latent heat of the saline water evaporation by a coolant. The coolant is configured to absorb heat rejected by the cooler.

In some embodiments, the coolant directly contacts the cooler and the evaporator, or circulates between the cooler and the evaporator, or circulates in a closed cycle path through, in sequence, a coolant tank, the cooler and the evaporator.

In some embodiments, the co-generation method further includes releasing heat rejected in the condenser into the environment or utilizing the heat rejected in the condenser to pre-heat saline water before the saline water is fed into the evaporator.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6A is an exemplary graphical illustration of effect of turbine inlet pressure on thermal efficiency of the Brayton cycle system, according to certain embodiments.

FIG. 6B is an exemplary graphical illustration of effect of turbine inlet pressure on overall effectiveness of the Brayton cycle adsorption desalination system, according to certain embodiments.

FIG. 7B is an exemplary graphical illustration of effect of chilled water temperature on net work output of the Brayton cycle adsorption desalination system, according to certain embodiments.

FIG. 7C is an exemplary graphical illustration of effect of chilled water temperature on heat input of the Brayton cycle adsorption desalination system, according to certain embodiments.

DETAILED DESCRIPTION

Figure 1:
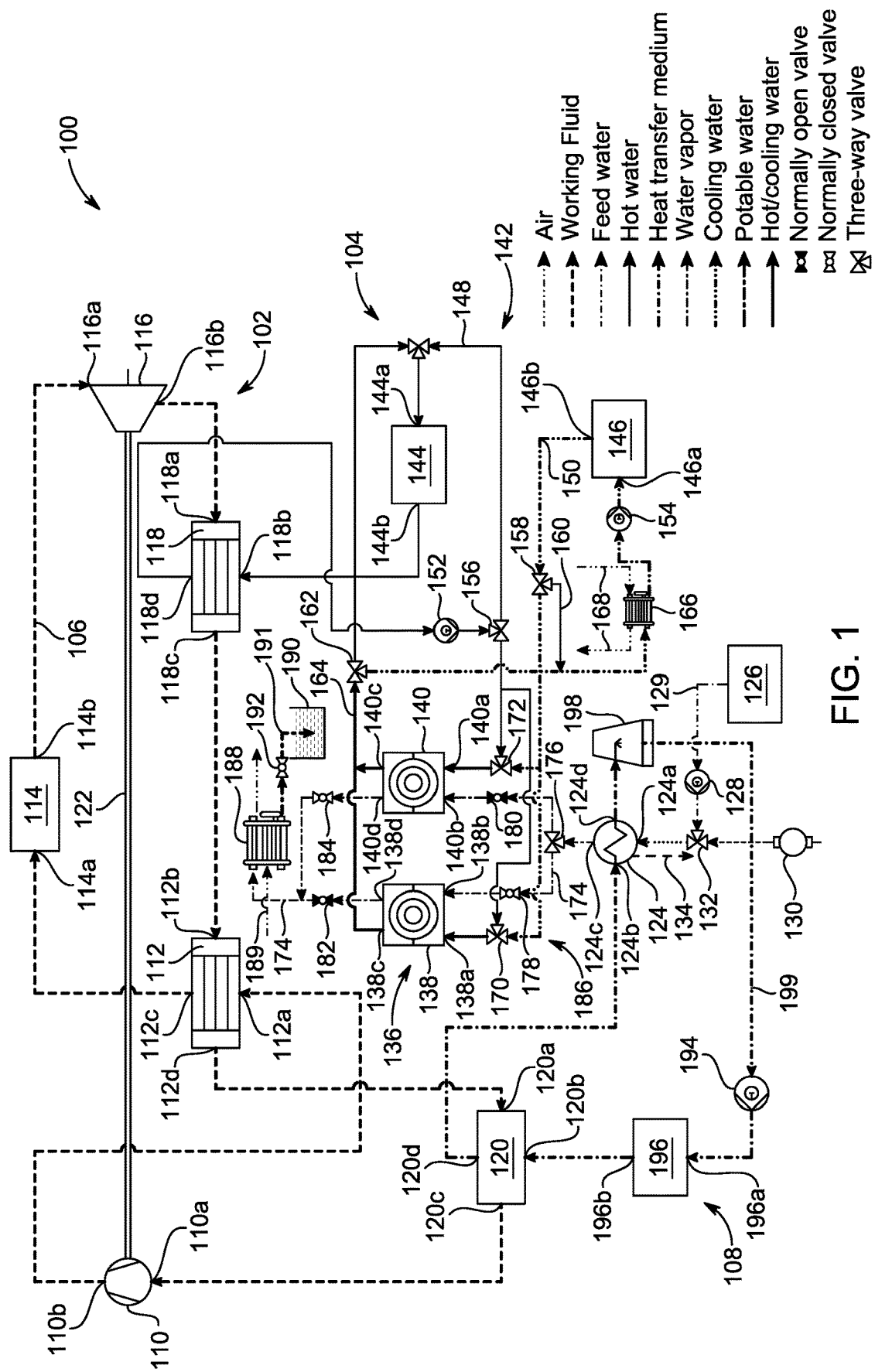
FIG. 1 is a schematic diagram of a Brayton cycle adsorption desalination system, according to one embodiment.

In the drawings, like reference numerals designate identical or corresponding parts throughout the several views.

Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a Brayton cycle adsorption desalination system and a co-generation method for concurrent desalination and energy generation. In particular, the present disclosure provides integration of a closed loop supercritical carbon dioxide recuperative Brayton cycle system and a low temperature adsorption desalination system at a primary heat exchanger and a cooler of the Brayton cycle system. The primary heat exchanger recovers waste heat from the Brayton cycle system and provides the heat source for desalination in the adsorption desalination system, while the cooler of the Brayton cycle system rejects heat to the adsorption desalination system. The system and the method of the present disclosure providing integration of the Brayton cycle system with the adsorption desalination system may be utilized for cogeneration or trigeneration, such as power, cooling and desalination applications.

Referring to FIG. 1, illustrated is a schematic diagram of a Brayton cycle adsorption desalination system 100 according to an aspect of the present disclosure. The Brayton cycle adsorption desalination system 100 includes a Brayton cycle system 102 and an adsorption desalination system 104. The Brayton cycle adsorption desalination system 100 provides synergetic integration of the Brayton cycle system 102 and the adsorption desalination system 104. Such integration of the Brayton cycle system 102 and the adsorption desalination system 104 permits the present Brayton cycle adsorption desalination system 100 to be utilized for cogeneration or trigeneration applications. For example, the present Brayton cycle adsorption desalination system 100 can be utilized for power generation, cooling/air-conditioning and desalination applications. In other examples, the present Brayton cycle adsorption desalination system 100 may be utilized for one or more combinations of liquid hydrogen generation for energy storage, providing mechanical output and the like. Note that the Brayton cycle adsorption desalination system 100 is also referred to as the system 100.

In the system 100, the Brayton cycle system 102 includes a Brayton cycle, which is a thermodynamic cycle well known in the art. The Brayton cycle system 102 involves compressing a working fluid flowing in a working fluid line 106, and then expanding the working fluid to perform work, for power generation and the like. In aspects of the present disclosure, the working fluid includes supercritical carbon dioxide (hereinafter also referred to as supercritical $CO_2$ or $SCO_2$). Due to properties of supercritical carbon dioxide, the Brayton cycle system 102 can operate at higher pressures and temperatures with compact machineries, thus resulting in higher thermal efficiency in optimal configuration and lower cost for the Brayton cycle system 102, and thereby the overall Brayton cycle adsorption desalination system 100. Although the present disclosure is described in terms of the working fluid being the $SCO_2$, it may be appreciated that other suitable working fluids, including, but not limited to, Helium gas (He), Xenon gas (Xe), Ethane, Sulfur Hexafluoride, Methane, etc. may be used as the working fluid for the Brayton cycle system 102 without departing from the spirit and the scope of the present disclosure.

As illustrated in FIG. 1, the Brayton cycle system 102 includes a compressor 110, a recuperator 112, a heater 114, a turbine 116, a primary heat exchanger (PHE) 118, and a cooler 120. Herein, the compressor 110 has an inlet 110a and an outlet 110b; the recuperator 112 has two inlets such as a first inlet 112a and a second inlet 112b, and two outlets such as a first outlet 112c and a second outlet 112d; the heater 114 has an inlet 114a and an outlet 114b; the turbine 116 has an inlet 116a and an outlet 116b; the PHE 118 has two inlets such as a first inlet 118a and a second inlet 118b, and two outlets such as a first outlet 118c and a second outlet 118d; and the cooler 120 has two inlets such as a first inlet 120a and a second inlet 120b, and two outlets such as a first outlet 120c and a second outlet 120d.

Particularly, in the Brayton cycle system 102, the compressor 110, the recuperator 112, the heater 114, the turbine 116, the PHE 118, and the cooler 120 can be configured to define a closed path cycle (as shown by the working fluid line 106) for the working fluid. In particular, the outlet 110b of the compressor 110 is connected to the first inlet 112a of the recuperator 112. Further, the first outlet 112c of the recuperator 112 is connected to the inlet 114a of the heater 114. Further, the outlet 114b of the heater 114 is connected to the inlet 116a of the turbine 116. Further, the outlet 116b of the turbine 116 is connected to the first inlet 118a of the PHE 118. Further, the first outlet 118c of the PHE 118 is connected to the second inlet 112b of the recuperator 112. Further, the second outlet 112d of the recuperator 112 is connected to the first inlet 120a of the cooler 120. Further, the first outlet 120c of the cooler 120 is connected to the inlet 110a of the compressor 110.

In the FIG. 1 example, the compressor 110 compresses the working fluid from a low pressure to a high pressure to obtain a compressed working fluid. For this purpose, the compressor 110 may be an electrical compressor or a thermal compressor as known in the art. The compressor 110 may be driven by an external energy source including, not limited to, a thermal power plant, a nuclear power plant, a renewable power plant using solar, wind, geothermal or any other suitable form of renewable energy, and the like. As illustrated, the compressor has a common shaft 122 associated therewith, and the turbine 116 is connected to the common shaft 122 to drive or be driven thereby. The compressed working fluid flows from the outlet 110b of the compressor 110 to the first inlet 112a of the recuperator 112.

Further, the recuperator 112 pre-heats the compressed working fluid to obtain a pre-heated working fluid. The recuperator 112 may utilize waste heat for this purpose, as discussed later. Subsequently, the pre-heated working fluid flows from the first outlet 112c of the recuperator 112 to the inlet 114a of the heater 114. Herein, the heater 114 heats the pre-heated working fluid, as received from the recuperator 112, to obtain a heated working fluid. In the present examples, the heater 114 may derive power for its operation from the same external energy source as the one driving the compressor 110 in the Brayton cycle system 102, or some other suitable independent energy source without any limitations. The heated working fluid flows from the outlet 114b of the heater 114 to the inlet 116a of the turbine 116.

Further, the heated working fluid passes through the turbine 116 such that the heated working fluid expands to output work and obtain an expanded working fluid. The output work from the turbine 116 may be utilized for one or more purposes, including power generation using a generator (not shown), liquid hydrogen generation for energy storage, and the like. As discussed, the turbine 116 is connected to the common shaft 122 and thus the output work may be used to drive the compressor 110, in the Brayton cycle system 102. Such operation of the turbine 116 may be contemplated by a person skilled in the art and thus has not been described further for the brevity of the present disclosure. The expanded working fluid flows from the outlet 116*b* of the turbine 116 to the first inlet 118*a* of the PHE 118.

Further, the expanded working fluid passes through the PHE 118 to obtain an exhaust. The PHE 118 is a heat exchanger used to recover heat that may still be present in the working fluid after expansion in the turbine 116. Herein, the term "exhaust" is being used to refer to the working fluid post heat recovery (transfer) therefrom via the PHE 118. Further, the term "heat exchanger" is used to include any heat exchange mechanism through which a coolant or a heat transfer medium can circulate. In some examples, the PHE 118 may include one or more discrete heat exchange devices coupled in series or in parallel. The PHE 118 may include any type of heat exchanger, such as a plate-type heat exchanger, a shell-type heat exchanger, or the like, which generally provides an enlarged effective heat exchanging area by for example being corrugated and/or provided with protruding portions of some suitable kind, such as flanges, to allow for heat transfer between two fluids.

In one embodiment, the PHE 118 includes a plate-type heat exchanger, which includes a plurality of plates stacked in series along a longitudinal axis, with the plates having the shape of a rectangle or square, or alternatively circular or cylindrical. The stack of plates can include an alternating series of hot plates (hot fluid plates) and cold plates (cold fluid plates) to allow for heat exchange.

In another embodiment, the PHE 118 includes a shell-type heat exchanger, which includes a shell structure and one or more tube structures inside the shell structure. A first fluid can flow through the one or more tube structures while a second fluid can flow over the tube structures (i.e., through the shell structure) so that heat is exchanged between the first fluid and the second fluid. The tube structures can include a thermal-conductive material to facilitate heat exchange between the first fluid and the second fluid, while the shell structures may include a thermal-insulating material to reduce heat loss to or heat gain from the environment. Further, the number of the tube structures, dimensions of the shell structure and the tube structures, geometry of the shell structure and the tube structures, etc. can be tailored to meet specific design requirements.

In the present configuration, the PHE 118 provides heat transfer from the working fluid received at the first inlet 118*a*, to a fluid (discussed later) being received at the second inlet 118*b*. For this purpose, in some examples, the PHE 118 may be designed to have the first inlet 118*a* and the second inlet 118*b* located adjacent to and in direct contact with each other to provide high contact area for heat transfer, and thereby provide high heat transfer rate. The exhaust from the first outlet 118*c* of the PHE 118 flows to the first inlet 112*a* of the recuperator 112.

As discussed earlier, the recuperator 112 pre-heats the working fluid to obtain the pre-heated working fluid. Particularly, in the recuperator 112, heat is transferred from the exhaust received from the PHE 118 to the working fluid received from the compressor 110. Herein, the recuperator 112 utilizes the waste heat from the exhaust, as received from the PHE 118, which may still have significant heat energy left after heat loss due to expansion of the working fluid at the turbine 116 and the heat transfer at the PHE 118, to pre-heat the working fluid before being transferred to the heater 114. This results in less heat energy being required at the heater 114 for heating of the pre-heated working fluid to obtain the heated working fluid, and thus increases a thermal efficiency of the present Brayton cycle system 102.

As used herein, the term "recuperator" includes heat transfer mechanisms and devices that allow a hot fluid exiting a heat exchanger (such as the PHE 118) or the like to be used to heat the working fluid. In some embodiments, the recuperator 112 is configured to function as a heat exchanger. Hence, similar to the PHE 118, the recuperator 112 may include one or more discrete heat exchange devices coupled in series or in parallel. The recuperator 112 may include any type of heat exchanger, such as a plate-type heat exchanger, a shell-type heat exchanger, or the like, the descriptions for which have been provided above and will be omitted here for simplicity purposes. In general, the term "recuperator" includes various types of heat exchangers regardless of its specific designation for a particular purpose.

Further, the exhaust from the second outlet 112*d* of the recuperator 112 is transferred to the cooler 120 via the first inlet 120*a*. In the present example, the cooler 120 is configured to cool the exhaust from the PHE 118. Specifically, the cooler 120 cools the exhaust (working fluid) as received from the recuperator 112 disposed between the PHE 118 and the cooler 120. Herein, the cooler 120 absorbs heat from the exhaust (which may further be rejected by the cooler 120, as discussed later) before transferring the exhaust back to the inlet 110*a* of the compressor 110, completing the closed path cycle of the Brayton cycle system 102. This may be done to have higher fluid density of the working fluid to be compressed by the compressor 110, and thereby requiring lower work input at the compressor 110 and increasing thermal efficiency of the overall Brayton cycle system 102. In the present example, the cooler 120 in the Brayton cycle system 102 is configured to exchange heat with, or specifically reject heat to, the adsorption desalination system 104. Further, the PHE 118 recovers waste heat from the Brayton cycle system 102 and provides heat source for desalination in the adsorption desalination system 104. For this purpose, the Brayton cycle system 102 and the adsorption desalination system 104 are connected at the PHE 118 and the cooler 120 so that the adsorption desalination system 104 may absorb heat rejected from the cooler 120 and utilize heat from the PHE 118, as required for its operation. The design and configuration details for achieving such synergistic integration will be discussed later in the description.

In some embodiments, the cooler 120 is configured to function as a heat exchanger. Hence, similar to the PHE 118 and the recuperator 112, the cooler 120 may include one or more discrete heat exchange devices coupled in series or in parallel. The cooler 120 may include any type of heat exchanger, such as a plate-type heat exchanger, a shell-type heat exchanger, or the like, the descriptions for which have been provided above and will be omitted here for simplicity purposes.

Further, as illustrated, the adsorption desalination system 104 includes an evaporator 124. In one or more examples, the evaporator 124 may be a rotary evaporator. The adsorption desalination system 104 may further include a feed water tank 126 to store and provide saline water to be desalinated by the system 100. In the adsorption desalination system 104, the evaporator 124 is configured for evaporating saline water to obtain water vapor. The evaporator 124 has two inlets, such as a first inlet 124*a* and a second inlet 124*b*, and two outlets, such as a first outlet 124*c* and a second outlet 124*d*. The adsorption desalination system 104 may include a pump 128 to pump in the saline water from the feed water tank 126 via a feed water line 129, to be supplied to the evaporator 124 via the first inlet 124*a*. Herein, the pump 128 may be any known type of suitable pump for the said purpose such as, but not limited to, a centrifugal pump, a submersible pump and the like. In an aspect of the present disclosure, as illustrated, the adsorption desalination system 104 may also include a vacuum pump 130 connected to the evaporator 124. The vacuum pump 130 may be connected to the evaporator 124 to reduce pressure within the evaporator 124, and thereby lowers a boiling temperature of the saline water enabling faster evaporation in the evaporator 124. As shown, the pump 128 and the vacuum pump 130 may be connected to the evaporator 124 via a three-way valve 132. Further, the adsorption desalination system 104 may include a line 134, in the form of a tube or a pipe, to discard brine solution left in the evaporator 124 after obtaining the water vapor. It may be appreciated that although the present disclosure has been described in terms of desalination of saline water as provided by the feed water tank 126; in other examples, the system 100 may be implemented for distillation of brackish water or the like, and in those cases, such brackish water may be provided by the feed water tank 126 to the evaporator 124.

The adsorption desalination system 104 further includes an adsorbent bed (generally represented by the reference numeral 136). In an aspect of the present disclosure, the adsorption desalination system 104 includes two or more adsorbent beds 136. In another aspect of the present disclosure, the two or more adsorbent beds 136 may be arranged in pairs of adsorbent beds 136, with the adsorption desalination system 104 including one or more pairs of adsorbent beds 136. In an aspect of the present disclosure, the adsorbent bed 136 includes silica gel for adsorbing and desorbing water vapor. The adsorbent bed 136 may include silica gel for adsorption of water vapor when cooled and desorption of water vapor when heated. In other examples, the adsorbent bed 136 may include zeolites, molecular sieve, activated carbon, metal organic frameworks (MOFs), covalent organic frameworks (COFs), and other new types of adsorbents under development. In the illustrated example, the adsorption desalination system 104 is shown to include one pair of adsorbent beds 136, including a first adsorbent bed 138 and a second adsorbent bed 140. Herein, the first adsorbent bed 138 has two inlets such as a first inlet 138a and a second inlet 138b, and two outlets such as a first outlet 138c and a second outlet 138d. Similarly, the second adsorbent bed 140 has two inlets such as a first inlet 140a and a second inlet 140b, and two outlets such as a first outlet 140c and a second outlet 140d.

In aspects of the present disclosure, the adsorption desalination system 104 also includes at least one heat transfer medium tank (generally represented by the reference numeral 142). The "heat transfer medium tank" is also referred to as "storage tank" without any limitations. The heat transfer medium tank 142 stores a heat transfer medium therein for the adsorption desalination system 104. In the present examples, the heat transfer medium may be water. Further, as illustrated, the heat transfer medium tank 142 may be divided into a hot water tank 144 and a cooling water tank 146 for the purposes of the present disclosure. As shown, the hot water tank 144 has an inlet 144a and an outlet 144b; and the cooling water tank 146 has an inlet 146a and an outlet 146b.

In the system 100, the heat transfer medium tank 142, the PHE 118 (from the Brayton cycle system 102) and the adsorbent beds 136 are configured to define a closed path cycle for the heat transfer medium. In particular, the adsorption desalination system 104 may include a hot water circuit including the hot water tank 144, allowing flow of hot water via a hot water line 148; and a cooling water circuit including the cooling water tank 146, allowing flow of cooling water via a cooling water line 150. The adsorption desalination system 104 may include a pump 152 to circulate the hot water in the hot water line 148 and a pump 154 to circulate the cooling water in the cooling water line 150, for working of the adsorption desalination system 104. Herein, the outlet 144b of the hot water tank 144 is connected to the second inlet 118b of the PHE 118. Further, the second outlet 118d of the PHE 118 is connected to the first inlets 138a, 140a of the adsorbent beds 138, 140. Further, the first outlets 138c, 140c of the adsorbent beds 138, 140 are connected to the inlet 144a of the hot water tank 144 and the inlet 146a of the cooling water tank 146.

In an example, a three-way valve 156 is provided to regulate the flow of hot water from the PHE 118 to the first inlets 138a, 140a of the adsorbent beds 138, 140, with excess of the hot water from the PHE 118 being made to flow back into the hot water tank 144 via the three-way valve 156. Also, the outlet 146b of the cooling water tank 146 is connected to the first inlets 138a, 140a of the adsorbent beds 138, 140. In an example, a three-way valve 158 is provided to regulate the flow of cooling water from the cooling water tank 146 to the adsorbent beds 138, 140 via a bypass line 160 to make some of the cooling water (like excess cooling water and/or cooling water with insufficient low temperature) flow back to the inlet 146a of cooling water tank 146 as per the requirement. Further, in an example, the first outlets 138c, 140c of the adsorbent beds 138, 140 are provided with a three-way valve 162 to control flow of hot/cooling water therefrom via a hot/cooling water line 164 to the inlet 144a of the hot water tank 144 and the inlet 146a of the cooling water tank 146. In some examples, the cooling water circuit may also include a water-to-air heat exchanger 166 which takes in and expels out air from ambient atmosphere via an air line 168 to lower temperature of the hot/cooling water before passing to the cooling water tank 146.

Further, the first inlets 138a, 140a of the adsorbent beds 138, 140 are provided with respective three-way valves, including a first three-way valve 170 for the first inlet 138a of the first adsorbent beds 138 and a second three-way valve 172 for the first inlet 140a of the second adsorbent beds 140. The three-way valves 170 and 172 are used to control the flow of the hot water and the cooling water to the first inlets 138a, 140a of the adsorbent beds 138, 140, as received from the hot water line 148 and the cooling water line 150. Also, as shown, the second inlets 138b, 140b of the adsorbent beds 138, 140 are connected to the evaporator 124 via a water vapor line 174. The water vapor line 174 includes a three-way valve 176 to divide and regulate the flow of obtained water vapor from the first outlet 124c of the evaporator 124 to the adsorbent beds 138, 140. The water vapor line 174 also includes two valves, including a first valve 178 for the second inlet 138b of the first adsorbent bed 138 and a second valve 180 for the second inlet 140b of the second adsorbent bed 140 to control the flow of obtained water vapor from the evaporator 124 into the respective adsorbent beds 138 and 140. Furthermore, the water vapor line 174 extends from the second outlets 138d, 140d of the adsorbent beds 138, 140. Herein, the water vapor line 174 includes two valves such as a third valve 182 for the second outlet 138d of the first adsorbent bed 138 and a fourth valve 184 for the second outlet 140d of the second adsorbent bed 140 to control the flow of desorbed water vapor (as explained hereinafter) from the adsorbent beds 138, 140. Herein, the first valve 178, the second valve 180, the third valve 182 and the fourth valve 184 may be one-way ball valves, as known in the art.

In the present example, the adsorbent bed 136 is used for adsorbing and desorbing the water vapor. Specifically, the two or more adsorbent beds 136 can operate in an alternate sequence of adsorption and desorption modes. In the present example, during operation of the adsorption desalination system 104, at a given instant, one of the two adsorbent beds 138 and 140 may be in an adsorption mode while the other of the two adsorbent beds 138 and 140 may be in a desorption mode. In a non-limiting example, during a first half of a cycle, the first adsorbent bed 138 is operated in an adsorption mode while the second adsorbent bed 140 is operated in a desorption mode. During a second half of the cycle, the first adsorbent bed 138 is operated in the desorption mode while the second adsorbent bed 140 is operated in the adsorption mode.

The adsorption desalination system 104 can include a switching valve (generally represented by reference numeral 186) configured to control the alternate sequence of adsorption and desorption modes. Herein, the switching valve 186 corresponds to a switching circuit formed by a combination of the first three-way valve 170, the second three-way valve 172, the three-way valve 176, the first valve 178, the second valve 180, the third valve 182 and the fourth valve 184. In an example, as illustrated, the first adsorption bed 138 may be operated in the adsorption mode and the second adsorption bed 140 may be operated in the desorption mode by controlling the three-way valve 176 to allow a flow of water vapor only to the first adsorption bed 138 and block the flow of the water vapor to the second adsorption bed 140. Meanwhile, the first valve 178 can be disposed in the open position and the third valve 182 disposed in the closed position while the second valve 180 can be disposed in the closed position and the fourth valve 184 disposed in the open position. Further, during operation, the cooling water from the cooling water line 150 flows to the first adsorption bed 138 via the first three-way valve 170 and the hot water from the hot water line 148 flows to the second adsorption bed 140 via the second three-way valve 172. This facilitates the water vapor from the evaporator 124 to be adsorbed by the first adsorption bed 138 by releasing latent heat of water condensation to the cooling water. This also facilitates adsorbed water vapor to be desorbed by the second adsorption bed 140 using the hot water received thereby. Conversely for disposing the first adsorption bed 138 in the desorption mode and the second adsorption bed 140 in the adsorption mode, the positions of the valves in the switching valve 186 as described above may be reversed.

In the adsorption desalination system 104, the first adsorption bed 138 and the second adsorption bed 140 may switch the sequence of adsorption and desorption modes after a predefined time period. For a fixed quantity of water vapor, a required time period for adsorption may be different from a required time period for desorption, with adsorption typically taking more time. In a non-limiting example, a median of the two required time periods may be taken for better operational efficiency. In an example, the predefined time period may be 40 seconds. That is, each of the first adsorption bed 138 and the second adsorption bed 140 may switch respective modes every 40 seconds.

The adsorption desalination system 104 further includes a condenser 188. The desorbed water vapor from the adsorbent beds 138, 140 are received at the condenser 188 via the water vapor line 174, based on opening and closing of the third valve 182 and the fourth valve 184. The condenser 188 can be in the form of a heat exchanger which takes in and expels out air from ambient atmosphere via an air line 189 (similar to the air line 168) to cool the received water vapor thereat. Thereby, the condenser 188 condenses the water vapor to obtain distilled water. The obtained distilled water is transferred to a water collection tank 190 via a potable water line 191 provided with a valve 192 to regulate the flow of distilled water, to maintain required pressure in the condenser 188. In an aspect of the present disclosure, the air line 189 from the condenser 188 may be connected to the feed water tank 126 to pre-heat the saline water therein before the saline water is fed into the evaporator 124 via the feed water line 129. This way the adsorption desalination system 104 may desalinate the saline water in the feed water tank 126, which in turn may be received from water sources like sea, lakes, etc.

As discussed, in the adsorption desalination system 104, the evaporator 124 can be configured for evaporating saline water to obtain water vapor. In this process, the evaporator 124 absorbs heat. The system 100 further includes a coolant circuit 108, with the evaporator 124 being a part of the coolant circuit 108. The coolant circuit 108 includes the evaporator 124 (from the adsorption desalination system 104), a pump 194, a coolant storage tank 196, a cooling tower 198 and the cooler 120 (from the Brayton cycle system 102). The coolant storage tank 196 is also referred to as "coolant tank 196", with the two terms being interchangeably used hereinafter. The coolant storage tank 196 has an inlet 196a and an outlet 196b. Herein, the coolant storage tank 196, the cooler 120 and the evaporator 124 are configured to define a closed path cycle for a coolant, flowing in a coolant line 199 of the coolant circuit 108. In an example, the coolant may be water generally at a low (chilling) temperature and has interchangeably been referred to as "chilled water" hereinafter without any limitations. In the coolant circuit 108, the outlet 196b of the coolant storage tank 196 is connected to the second inlet 120b of the cooler 120. The second outlet 120d of the cooler 120 is connected to the second inlet 124b of the evaporator 124. The second outlet 124d of the evaporator 124 is connected to the inlet 196a of the coolant storage tank 196. Herein, the coolant rejects heat at the evaporator 124 for evaporation of the saline water therein, to achieve the low temperature and is circulated by the pump 194 to the coolant storage tank 196. The coolant from the coolant storage tank 196 is further supplied to the cooler 120 of the Brayton cycle system 102 via the second inlet 120b thereof. In the cooler 120, the coolant absorbs heat to cool the exhaust received thereat from the PHE 118.

In the coolant circuit 108, the cooling tower 198 may be utilized to further lower the temperature of the coolant by expansion, as may be contemplated by a person skilled in art and understands the functioning of cooling towers. In an aspect of the present disclosure, as illustrated in FIG. 1, the cooling tower 198 is disposed between the evaporator 124 and the coolant storage tank 196. In other aspects of the present disclosure, a position of the cooling tower 198 may be changed in the coolant circuit 108 without any limitations.

Figure 2:
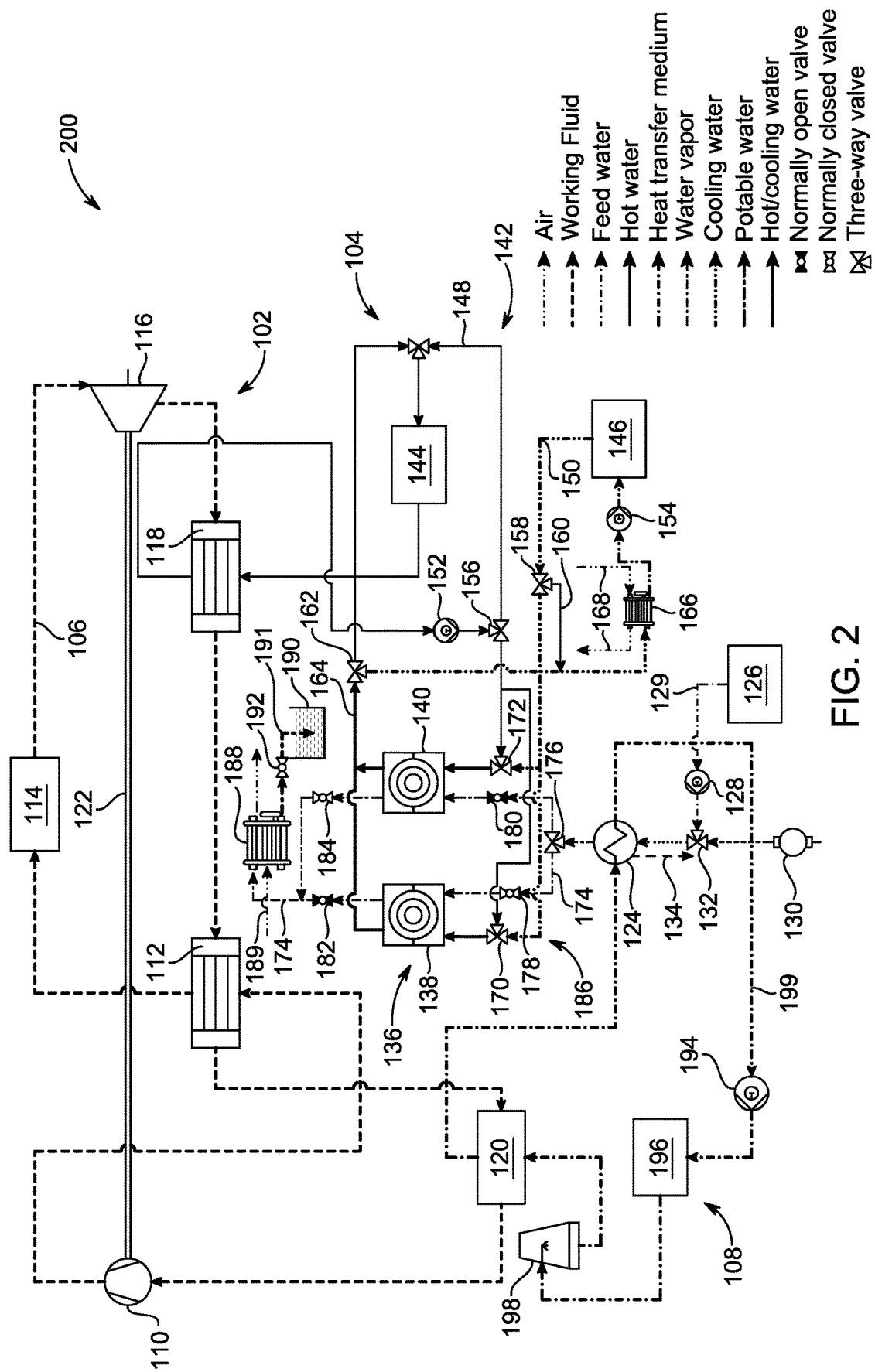
FIG. 2 is a schematic diagram of a Brayton cycle adsorption desalination system, according to another embodiment.
Figure 3:
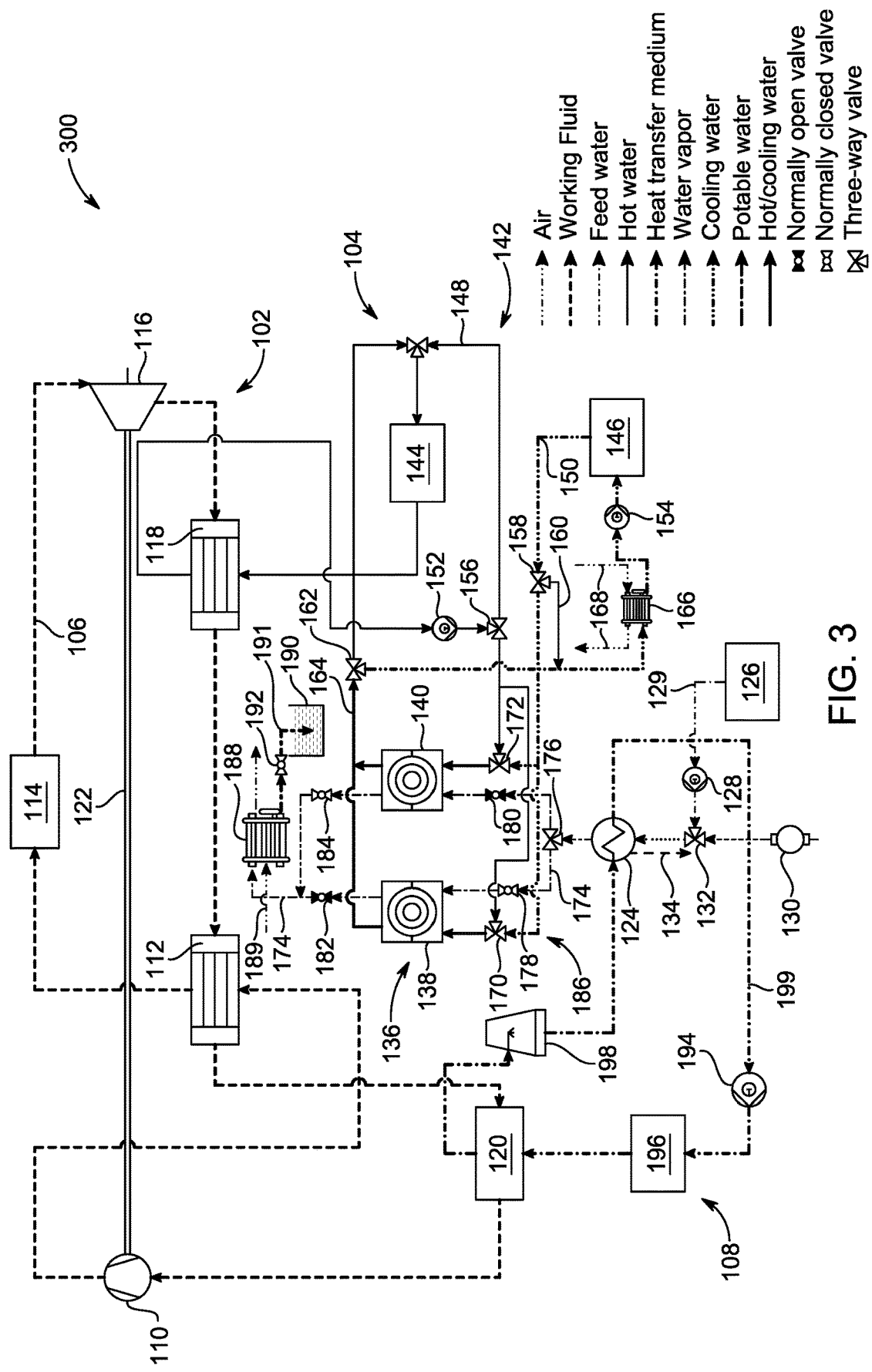
FIG. 3 is a schematic diagram of a Brayton cycle adsorption desalination system, according to yet another embodiment.

FIG. 2 and FIG. 3 illustrate alternative configurations of the Brayton cycle adsorption desalination system 100 of FIG. 1, showing a Brayton cycle adsorption desalination system 200 and a Brayton cycle adsorption desalination system 300, respectively. In the Brayton cycle adsorption desalination system 200 of FIG. 2, the cooling tower 198 is disposed between the coolant storage tank 196 and the cooler 120. In the Brayton cycle adsorption desalination system 300 of FIG. 3, the cooling tower 198 is disposed between the cooler 120 and the evaporator 124. Other components of the Brayton cycle adsorption desalination system 200 and the Brayton cycle adsorption desalination system 300 may be configured similar to respective arrangement in the Brayton cycle adsorption desalination system 100 of FIG. 1 as described above.

In each of the Brayton cycle adsorption desalination systems 100, 200, 300, the PHE 118 can recover waste heat from the Brayton cycle system 102 and be configured to function as a heat source for desalination in the adsorption desalination system 104, while the cooler 120 of the Brayton cycle system 102 rejects heat to the adsorption desalination system 104. For this purpose, the Brayton cycle system 102 and the adsorption desalination system 104 are connected at the PHE 118 so that the PHE 118 is configured to function as a heat source for the adsorbent beds 136. Further, the Brayton cycle system 102 and the adsorption desalination system 104 are connected at the cooler 120 so that the evaporator 124 is configured to absorb heat rejected from the cooler 120. In an aspect of the present disclosure, the PHE 118 and the adsorbent beds 136 are in direct contact for heat exchange. In an aspect of the present disclosure, the evaporator 124 and the cooler 120 are in direct contact for heat exchange. Such direct contact ensures maximum heat exchange which may therefore increase thermal efficiency of the systems 100, 200, 300. The present synergistically integrated systems 100, 200, 300 of the Brayton cycle system 102 with the adsorption desalination system 104 can be used for trigeneration (power, cooling, and desalination) applications.

Figure 4:
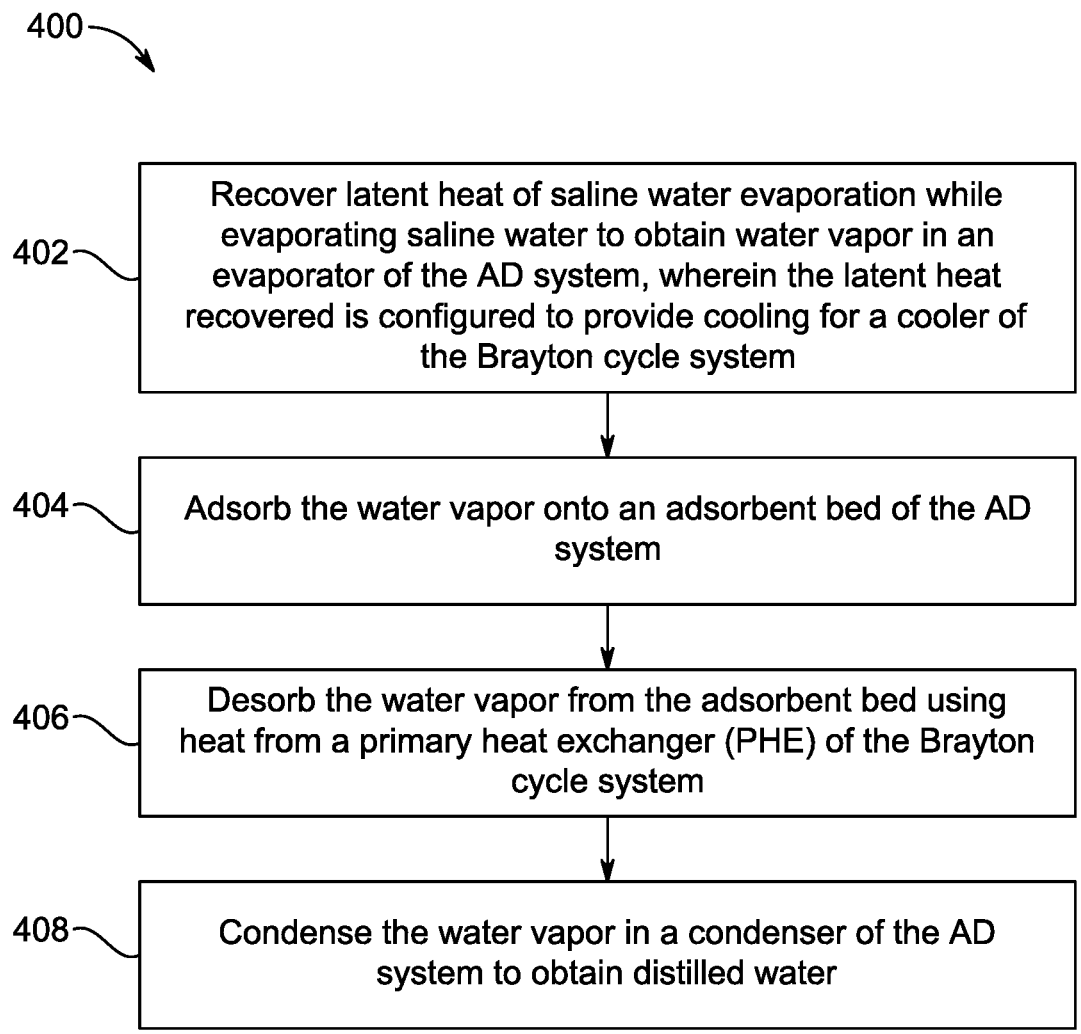
FIG. 4 is an exemplary flowchart of a co-generation method for concurrent desalination and energy generation, according to certain embodiments.

Referring to FIG. 4, an exemplary flowchart of a method 400 of integrating a Brayton cycle system (e.g., the Brayton cycle system 102) and an adsorption desalination system (e.g., the adsorption desalination (AD) system 104) is illustrated. The method 400 is described with reference to the Brayton cycle adsorption desalination systems 100, 200 and 300 illustrated in FIGS. 1-3.

At step 402, the method 400 includes recovering latent heat of saline water evaporation while evaporating saline water to obtain water vapor in an evaporator (e.g., the evaporator 124) of the AD system (e.g., the AD system) 104. In some embodiments, the latent heat recovered is configured to provide cooling for a cooler (e.g., the cooler 120) of the Brayton cycle system (e.g., the Brayton cycle system 102). For example, in the AD system 104, the evaporator 124 is configured for evaporating saline water to obtain water vapor. In this process, the evaporator 124 absorbs heat. Further, in the coolant circuit 108, the coolant rejects heat at the evaporator 124. The coolant is further supplied to the cooler 120. In the cooler 120, the coolant absorbs heat to cool the exhaust received thereat from the PHE 118 of the Brayton cycle system 102.

In some embodiments, the method 400 further includes circulating the working fluid in the closed cycle path through, in sequence, the compressor 110 of the Brayton cycle system 102, the recuperator 112 of the Brayton cycle system 102, the heater 114 of the Brayton cycle system 102, the turbine 116 of the Brayton cycle system 102, the PHE 118, the recuperator 112 and the cooler 120. In some embodiments, the method 400 further includes compressing the working fluid from a low pressure to a high pressure in the compressor 110 to obtain a compressed working fluid. The compressed working fluid flows from the outlet 110b of the compressor 110 to the first inlet 112a of the recuperator 112. The method 400 further includes pre-heating the working fluid in the recuperator 112 to obtain the pre-heated working fluid. The pre-heated working fluid flows from the first outlet 112c of the recuperator 112 to the inlet 114a of the heater 114. The method 400 further includes heating the pre-heated working fluid in the heater 114 to obtain the heated working fluid. The heated working fluid flows from the outlet 114b of the heater 114 to the inlet 116a of the turbine 116. The method 400 further includes outputting work using the turbine 116 by passing the heated working fluid through the turbine 116 such that the heated working fluid expands to output work and obtain the expanded working fluid. The expanded working fluid flows from the outlet 116b of the turbine 116 to the first inlet 118a of the PHE 118. The method 400 further includes passing the expanded working fluid through the PHE 118 to obtain the exhaust. The exhaust from the first outlet 118c of the PHE 118 flows to the first inlet 112a of the recuperator 112. The method 400 further includes pre-cooling the exhaust in the recuperator 112 by bringing the exhaust from the PHE 118 into thermal contact with the working fluid from the compressor 110. Further, the exhaust from the second outlet 112d of the recuperator 112 is transferred to the cooler 120 via the first inlet 120a thereof. The method 400 further includes cooling the exhaust in the cooler 120. The cooler 120 cools the exhaust from the PHE 118 using the latent heat recovered from the evaporator 124 of the AD system 104 to provide cooling for the cooler 120 of the Brayton cycle system 102.

At step 404, the method 400 includes adsorbing the water vapor onto an adsorbent bed (e.g., the adsorbent bed 136) of the AD system 104. In some embodiments, the three-way valves 170, 172 are used to control the flow of the cooling water to the inlet of the adsorbent bed 136, as received from the cooling water line 150. In some embodiments, the adsorbent bed 136 includes the silica gel for adsorption of water vapor when cooled using the cooling water.

At step 406, the method 400 further includes desorbing the water vapor from the adsorbent bed using heat from a primary heat exchanger (PHE) (e.g., the PHE 118) of the Brayton cycle system. In some embodiments, the three-way valves 170, 172 are used to control the flow of the hot water to the inlet of the adsorbent bed 136, as received from the PHE 118 via the hot water line 148. The adsorbent bed 136 use the silica gel for desorption of water vapor when heated using the hot water.

In an aspect of the present disclosure, the method 400 further includes operating the first adsorbent bed 138 and the second adsorbent bed 148 of the AD system 104 in an alternate sequence of adsorption and desorption modes in a single stage by: during a first half of a cycle, operating the first adsorbent bed 138 in the adsorption mode while operating the second adsorbent bed 140 in the desorption mode; during a second half of the cycle, operating the first adsorbent bed 138 in the desorption mode while operating the second adsorbent bed 140 in the adsorption mode; and during the cycle, operating the evaporator 124 and the condenser 188 continuously while connecting the evaporator 124 and the condenser 188 to at least one of the first adsorbent bed 130 or the second adsorbent bed 140. The first adsorption bed 138 may be operated in the adsorption mode and the second adsorption bed 140 may be operated in the desorption mode by controlling the three-way valve 176 to allow the flow of water vapor only to the first adsorption bed 138 and block the flow of water vapor to the second adsorption bed 140. Meanwhile, the first valve 178 can be disposed in the open position and the third valve 182 disposed in the closed position while the second valve 180 can be disposed in the closed position and the fourth valve 184 disposed in the open position thereof. Further, during operation, the cooling water from the cooling water line 150 flows to the first adsorption bed 138 via the first three-way valve 170 and the hot water from the hot water line 148 flows to the second adsorption bed 140 via the second three-way valve 172. This facilitates the water vapor from the evaporator 124 to be adsorbed by the first adsorption bed 138 and also facilitates adsorbed water vapor to be desorbed from the second adsorption bed 140. In reverse modes, with the first adsorption bed 138 in the desorption mode and the second adsorption bed 140 in the adsorption mode, the positions of the valves may be reversed.

In some embodiments, the method 400 further includes desorbing the water vapor from the adsorbent bed 136 using the heat from the PHE 118 by using the heat transfer medium to transfer heat from the PHE 118 to the adsorbent bed 136. For example, the hot water from the hot water line 148 flows to the second adsorption bed 140 via the second three-way valve 172. This facilitates the adsorbed water vapor to be desorbed by the second adsorption bed 140.

At step 408, the method 400 further includes condensing the water vapor in a condenser (e.g., the condenser 188) of the AD system to obtain distilled water. Herein, the desorbed water vapor from the adsorbent beds 138 and 140 are received at the condenser 188 via the water vapor line 174, based on opening and closing of the third valve 182 and the fourth valve 184. The condenser 188 can be in the form of a heat exchanger which takes in and expels out air from ambient atmosphere to cool the received water vapor thereat. Thereby, the condenser 188 condenses the water vapor to obtain distilled water.

In some embodiments, the method 400 further includes circulating the heat transfer medium in the closed cycle path through, in sequence, the heat transfer medium tank 152, the PHE 118 and the adsorbent bed 136. In particular, the adsorption desalination system 104 may define the hot water circuit including the hot water tank 144, allowing flow of hot water via the hot water line 148; and the cooling water circuit including the cooling water tank 146, allowing flow of cooling water via the cooling water line 150. Herein, the outlet 144b of the hot water tank 144 is connected to the second inlet 118b of the PHE 118. Further, the second outlet 118d of the PHE 118 is connected to the first inlets 138a, 140a of the adsorbent beds 138, 140. Further, the first outlets 138c, 140c of the adsorbent beds 138, 140 are connected to the inlet 144a of the hot water tank 144 and the inlet 146a of the cooling water tank 146.

In some embodiments, the method 400 further includes recovering the latent heat of the saline water evaporation by the coolant. For example, the coolant is configured to absorb heat rejected by the cooler 120. As discussed, in the adsorption desalination system 104, the evaporator 124 is configured for evaporating saline water to obtain water vapor. In this process, the evaporator 124 absorbs heat. Herein, the coolant rejects heat at the evaporator 124, to be absorbed by the evaporator 124 for evaporation of the saline water therein, to get to the low temperature and is circulated by the pump 194 to the coolant storage tank 196. The coolant from the coolant storage tank 196 is further supplied to the cooler 120 of the Brayton cycle system 102 via the second inlet 120b thereof. In the cooler 120, the coolant absorbs heat to cool the exhaust received thereat from the PHE 118.

In an aspect of the present disclosure, the coolant directly contacts the cooler 120 and the evaporator 124, or circulates between the cooler 120 and the evaporator 124, or circulates in a closed cycle path through, in sequence, the coolant tank 196, the cooler 120 and the evaporator 124. In the illustrated examples of FIGS. 1-3, in the coolant circuit 108, the outlet 196b of the coolant tank 196 is connected to the second inlet 120b of the cooler 120, the second outlet 120d of the cooler 120 is connected to the second inlet 124b of the evaporator 124, and the second outlet 124d of the evaporator 124 is connected to the inlet 196a of the coolant tank 196. Herein, the coolant may circulate between the cooler 120 and the evaporator 124.

In an aspect of the present disclosure, the method 400 further includes releasing heat rejected in the condenser 188 into the environment or utilizing the heat rejected in the condenser 188 to pre-heat saline water before the saline water is fed into the evaporator 124. For this purpose, the air line 189 from the condenser 188 may be connected to the feed water tank 126 to pre-heat the saline water therein before the saline water is fed into the evaporator 124 via the feed water line 129.

In general, in the present closed loop supercritical carbon dioxide Brayton cycle system 102, the working fluid at a lower pressure is compressed to high pressure and enters the colder side of the recuperator 112 and further heated before entering the heater 114. The heated working fluid then passes through the turbine 116 producing mechanical work and thereby expanding. The working fluid exits the turbine and then enters the PHE 118 to act as a heat source for adsorption desalination. The hot exhaust from the PHE 118 enters the recuperator 112 preheating the working fluid from the compressor 110 and cools down before entering the cooler 120. Although in the present disclosure, the Brayton cycle system 102 has been described to have a recuperative cycle configuration, in other examples, the Brayton cycle system 102 may have recompression based, regenerative based or partial cooling based configurations with some minor modification as may be contemplated by a person skilled in the art.

Further, the coolant (chilled water) is used to recover the cooling effect due to evaporation at low pressure. The cooling effect could be used for air-conditioning or other applications depending on the coolant temperatures. This is followed by adsorption or desorption of water vapor onto/from an adsorbent packed in the adsorber bed 136, most commonly silica gel for temperatures below 140° C., followed by condensation at the condenser 188. The condensed or freshwater can then be collected in the water collection tank 190 for distribution. In the present examples, an air-cooled condenser is used despite lower performance of the AD system 104 due to the lack of soft makeup water in tropical summers and for lower system cost.

In the AD system 104, two or more adsorbent packed beds 138 and 140 operate in alternate or batch sequences of adsorption and desorption modes to achieve thermal compression effects in single or multiple stages. Each adsorbent bed 138 and 140 alternates between adsorption and desorption modes with the help of switching valves and for a predefined time period. During the first half of the cycles, one bed starts the adsorption process, while the other operates in the desorption mode. During the next half of the cycles, the roles are reversed between the two beds, while the evaporator 124 and the condenser 188 operate continuously and connected to at least one bed. The number of pairs of the adsorbent bed 136 could be increased to produce larger output. The adsorption process involves two sub-processes, namely precooling and adsorption, while desorption sub-process involves pre-heating and desorption. These processes are batch processes and operate for the predefined time which varies with the increase in the number of adsorbent beds 136.

In a non-limiting example, during operation, temperatures in the system 100 can be set as shown in Table 1.

TABLE 1

| Components | Temperature Range (° C.) |
| --- | --- |
| The inlet 110a of the compressor 110 | 32-50, preferably 36-46, preferably 39-43 |
| The outlet 110b of the compressor 110 | 63-80, preferably 67-76, preferably 70-73 |
| The second outlet 112d of the recuperator 112 | 254-270, preferably 258-266, preferably 260-264 |
| The outlet 114b of the heater 114 | 450-550, preferably 470-530, preferably 490-510, preferably about 500 |
| The outlet 116b of the turbine 116 | 370-390, preferably 375-385, preferably 378-382 |
| The first outlet 118c of the PHX 118 | 350-380, preferably 360-370, preferably 363-367 |
| The first outlet 112c of the recuperator 112 | 65-80, preferably 68-77, preferably 71-74 |
| The first outlet 120c of the cooler 120 | 32-50, preferably 37-45, preferably 40-42 |
| The first inlet 124a of the evaporator 124 | 27-30, preferably 28-29 |
| The first outlet 124c of the evaporator 124 | 30-35, preferably 31-34, preferably 32-33 |
| The second inlet 124b of the evaporator 124 | 25-27, preferably about 26 |
| The second outlet 124d of the evaporator 124 | 15-20, preferably 16-19, preferably 17-18 |
| The adsorbent bed 136 (adsorption mode) | 25-50, preferably 30-45, preferably 35-40 |
| The adsorbent bed 136 (desorption mode) | 65-80, preferably 68-77, preferably 70-75 |
| The condenser 188 | 35-80, preferably 45-70, preferably 55-60 |

In the system 100, the integration between the Brayton cycle system 102 and the adsorption desalination system 104 is synergetic, and not in the conventional approach of a topping-bottoming cycle. With this, lower compressor inlet temperatures are possible as the coolant (chilled water) is typically below 25° C. compared to higher ambient temperatures in tropical climates, and further leads to lower compressor work input due to higher fluid density as inlet approaches vapor dome, and thus results in a higher thermal efficiency (e.g., heat rejection and compressor work) of 32-44%, preferably 35-40%, due to decreased cycle low temperatures. In contrast, related examples without such integration between a Brayton cycle system and an adsorption desalination system usually has a thermal efficiency (e.g., heat rejection and compressor work) of 18-35%. Further, the use of $SCO_2$ as the working fluid and water as the heat transfer medium provides that densities of two fluids in the cooler 120 will be more compatible than when using air for cooling, which reduces footprint of the cooler 120 and also better match of specific heat capacities of $SCO_2$ and water compared to air results in lower coolant exit temperatures at the cooler 120. Further, in the present system 100, since evaporation occurs at lower temperatures, such as 25-40° C., preferably 30-35° C., and at lower pressures, such as 1700-3000 Pa, preferably 2000-2700 Pa, preferably 2200-2500 Pa, therefore it does not contribute to scaling or corrosion in piping and components. Also, lower evaporation temperature leads to a high rate of water adsorption in the adsorbent bed 136 and further adsorbent capacity may be regenerated using low temperature heat source.

Furthermore, the system 100 operates with low specific electrical energy consumption, so it has the potential to be coupled with medium-to-high temperature co-generation or tri-generation applications to utilize waste heat. The integration of the Brayton cycle system 102 with the adsorption desalination system 104 finds its application in low to medium temperature and pressure applications. There are many challenges in adopting large scale solutions for rural areas. For example, the cost of electricity generation at large scale can be high due to low population density and poor transportation network. Grid extension for better distribution is also not economical due to low population density, and transportation costs increase for continuous supply of fuel and other resources to remote regions; the system 100 may be suitable for such rural applications since the Brayton cycle system 102 can operate at higher pressures (for example turbine inlet pressures of 10-45 MPa, more preferably 10-25 or 15-20 MPa) and temperatures with compact machineries, thus resulting in a higher thermal efficiency (e.g., heat rejection and compressor work) of 32-44%, preferably 35-40% in optimal configuration and lower system cost.

As has been described above, the Brayton cycle system 102 and the adsorption desalination system 104 are connected at the PHE 118 so that the PHE 118 is configured to function as a heat source for the adsorbent bed 136. The Brayton cycle system 102 and the adsorption desalination system 104 are also connected at the cooler 120 so that the evaporator 124 is configured to absorb heat rejected from the cooler 120. As a result, the Brayton cycle system 102 and the adsorption desalination system 104 are synergistically integrated.

Synergism or synergy manifests itself in several aspects of the system (e.g., 100, 200, and 300) and the corresponding method 400. For example, the system 100 can have an overall improved thermal efficiency of, for example, 32-44% or 35-40% at a turbine inlet temperature of 500° C. The thermal efficiency is calculated by dividing the sum of power, cooling, and desalination output by the heat input to the cycle. The improved thermal efficiency can be obtained, for example, by setting coolant supply temperature (e.g., temperature of the second inlet 120b) at 17-25° C. and coolant return temperature (e.g., temperature of the second outlet 120d or 124b) at 25-30° C. The Brayton cycle system 102 can have a thermal efficiency of for example 10-45%, 15-40%, 20-35%, or 25-30%, and the AD system 104 can have an thermal efficiency of 10-35%, 15-30%, or 20-25%. For example, the advantage of synergistically integrating the Brayton cycle system with adsorption desalination system is that the cooling effect produced in the AD system could be used in the Brayton cycle's cooler to achieve a desired compressor inlet temperature.

EXPERIMENTAL DATA

A steady-state recuperative supercritical $CO_2$ Brayton cycle system 102 with a high temperature of 500° C. integrated with a single-stage two-bed silica gel based adsorption desalination system 104 was employed for generating the experimental data, as described herein. A lumped parameter model was used to simulate the temperature changes in the adsorbent bed 136. The equilibrium uptake was modeled using Toth's isotherm, while the time-dependent transient water vapor uptake was modeled using Linear Driving Force equation. Their constants and other relevant parameters are provided in Table 2 below. A half-cycle time of 600 seconds and a switching time of 40 seconds was selected based on the water vapor uptake capability of the silica gel ($R_p$=4E-04 m). The energy balance equations were solved for each sub-process within the corresponding cycle time duration and the temperature profiles for different stages of the desalination process were modeled.

TABLE 2

| Parameters | Values (Units) |
|---|---|
| Brayton cycle system | |
| Reference temperature, $T_{ref}$ | 25° C. |
| $\eta_{comp}$ & $\eta_{turb}$ | 90% |
| Cycle low pressure, P1 | 8.07 MPa |
| Pressure ratio | 1.2-3 |
| Mass flow rate of $CO_2$, $\dot{m}_{CO_2}$ | 0.5 kg · s |
| Approach $\Delta T_{recupemtor,minimum}$ | 5° C. |
| Approach $\Delta T_{cooler,minimum}$ | 7° C. |
|  | (varies for some cases) |
| Effectiveness, $\varepsilon_{PHE}$ | 0.75 |
| Adsorption desalination system | |
| Mass transfer coefficient, $K_0$ | 7.3E−13 $Pa^{-1}$ |
| Kinetic constant, Dso | 2.54E−04 $m^2 \cdot s^{-1}$ |
| Heat of adsorption, $h_{ads}$ | 2693 $kJ \cdot kg^{-1}$ |
| Activation energy, $E_a$ | 4.2E+04 $J \cdot mole^{-1}$ |
| Uptake, $\varphi_m$ | 0.45 |
| Constant, j | 12 |
| Particle radius, $R_p$ | 0.4 mm |
| Specific heat, Cp | 921 $J \cdot kg^{-1} \cdot K^{-1}$ |
| Half cycle time, $t_{half}$ | 600 s |
| Switching time, $t_{switch}$ | 40 s |
| Adsorption pressure, $P_{ads}$ | 3000 Pa |
| Adsorption temperature, $T_{ads}$ | 30° C. |
|  | (varies for some cases) |
| $\dot{m}_{feed}$, $\dot{m}_{chilled}$, $\dot{m}_{cw}$, $\dot{m}_{hw}$ | 0.4 $kg \cdot s^{-1}$ |
| Mass of silica gel, $M_{SG}$ | 8 kg |

The integrated system performance was analyzed through energy, exergy, parametric analysis, and by comparison with a stand-alone Supercritical Recuperative Brayton Cycle (SREBC). Impact of key process parameters such as chilled water temperature, compressor inlet temperature and turbine inlet temperature on the integrated cycle are analyzed through parametric study and overall system effectiveness. Cycle outputs such as net power output, desalination, and cooling output were also determined. Further, exergy analysis was conducted for various operating conditions of the cycle to understand the exergy destruction rates at those conditions. Finally, the performance of the integrated cycle was compared with a stand-alone closed loop Brayton cycle to emphasize the performance gain. This performance gain was compared with similar cogeneration cycle in the literature but with multi-effect desalination technology.

Figure 5:
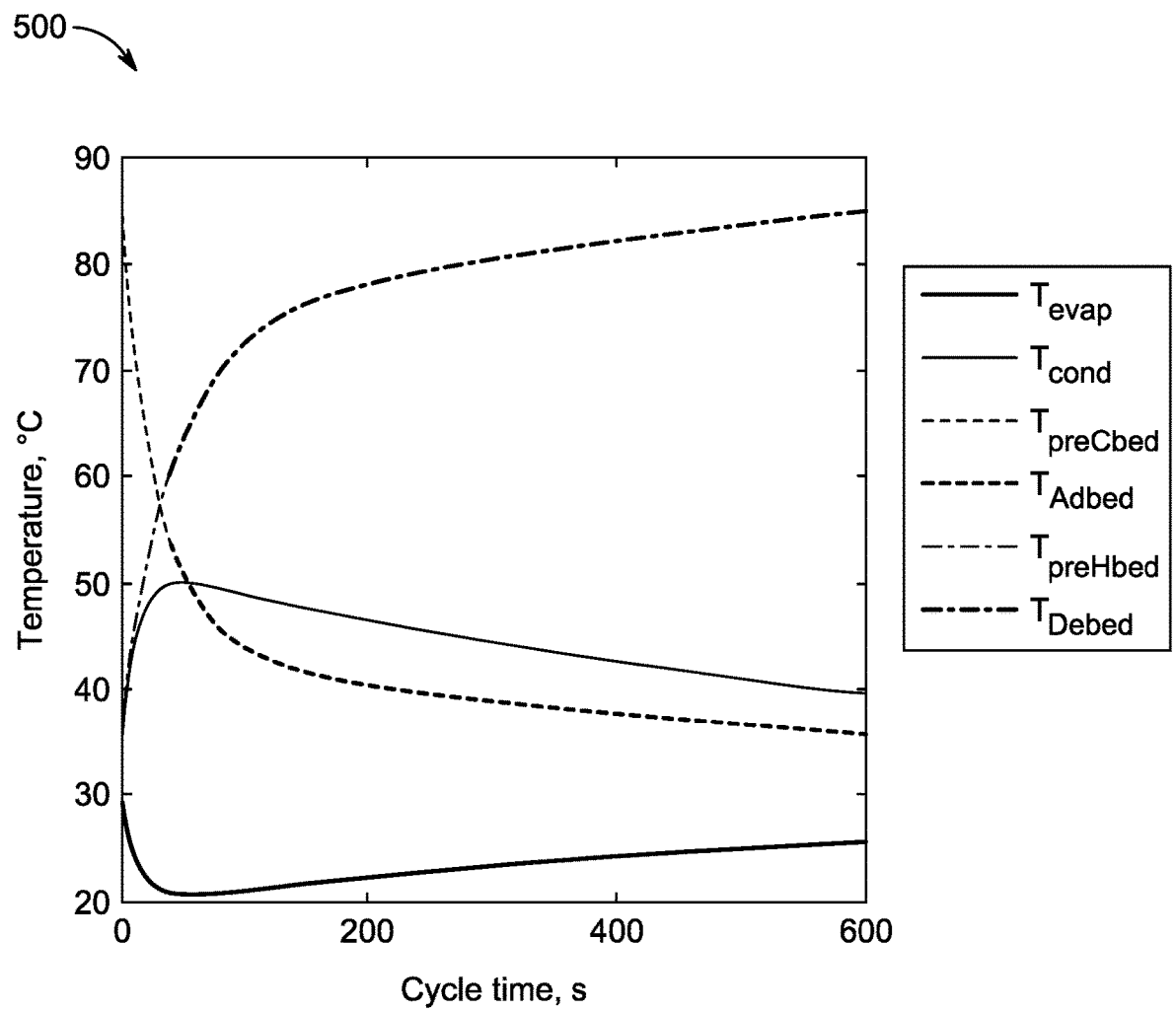
FIG. 5 is an exemplary graphical illustration of a temperature profile of the adsorption desalination system, according to certain embodiments.

Referring to FIG. 5, an exemplary graphical illustration 500 of a temperature profile of the adsorption desalination system is illustrated. Herein, a single-stage two-bed adsorption desalination system was modeled using MATLAB for hot water, chilled water, and cooling water inlet temperature of 85° C., 30° C., and 29.5° C., respectively. The temperature profile of different components at various cycle times is visualized in FIG. 5. The evaporator temperature profile indicates water evaporation at low temperatures and pressures releasing the latent heat of vaporization. The chilled water was passed through the evaporator ($T_{evap}$ in FIG. 5) to recover this latent heat. As the temperature in the adsorber bed decreases through precooling by cooling water, the valves connecting the beds to the evaporator are opened for water uptake (or adsorption) by silica gel packed in the adsorber bed ($T_{preCbed}$ and $T_{Adbed}$ in FIG. 5). To release adsorbed water vapor, the temperature is increased in the bed during the preheating and desorption processes ($T_{preHbed}$ and $T_{Debed}$ in FIG. 5) due to heat input from hot water tubes. The three-way valves connecting the beds to the condenser are opened once the bed pressure is higher than the condenser pressure. The water vapor was condensed by using the air-cooled condenser ($T_{cond}$ in FIG. 5) and fresh water was collected in a storage tank. The evaporator and condenser are continuously operating, while the adsorber beds operate in batch mode (switching between different sub-processes).

Referring to FIG. 6A, an exemplary graphical illustration 600A of effect of turbine inlet pressure on thermal efficiency of the Brayton cycle system is illustrated. Further referring to FIG. 6B, an exemplary graphical illustration 600B of effect of turbine inlet pressure on overall effectiveness of the Brayton cycle adsorption desalination system is illustrated. Herein, the turbine inlet temperature was varied over a wide range from 300° C. to 700° C. for this parametric study and its effect on the recuperative Brayton cycle and overall effectiveness was studied. The turbine inlet pressure was varied from 10 MPa to 25 MPa for each of the inlet temperatures while keeping all the other process parameters fixed. The chilled water temperature and cooler approach temperature difference for the integrated cycle was assumed to be 25° C. and 10° C. respectively for this analysis. The SREBC low pressure was 8.07 MPa. As depicted in FIG. 6A, the thermal efficiency increases by 19% percentage points between the turbine inlet extremes and a maximum of about 43% was achieved at 700° C. and 25 MPa. In the case of overall system effectiveness, desalination and cooling output was also considered. The hot water inlet temperature for desalination in this study was fixed at 85° C. for rural application feasibility and adsorbent suitability. So, increase in turbine inlet temperature of Brayton Cycle (BC) doesn't translate to improved output from the desalination cycle as the maximum hot water inlet temperature to AD was fixed. As depicted in FIG. 6B, between the extreme values of turbine inlet conditions, the overall system effectiveness improves by about 48%, with a maximum of 0.508 observed at 700° C. and 25 MPa. The effect of Turbine Inlet Temperature (TIT) on cycle thermal efficiency and overall system effectiveness may be seen in FIGS. 6A-6B. Despite higher efficiencies at 700° C., the TIT was fixed at 500° C. due to the suitability with the adsorption desalination cycle using silica gel and solar technology limitation for small-scale power generation in rural areas. It may be appreciated that higher turbine inlet temperatures may probably necessitate multi-stage turbines or alternate configurations of the Brayton cycle or different desalination technology.

Figure 7A:
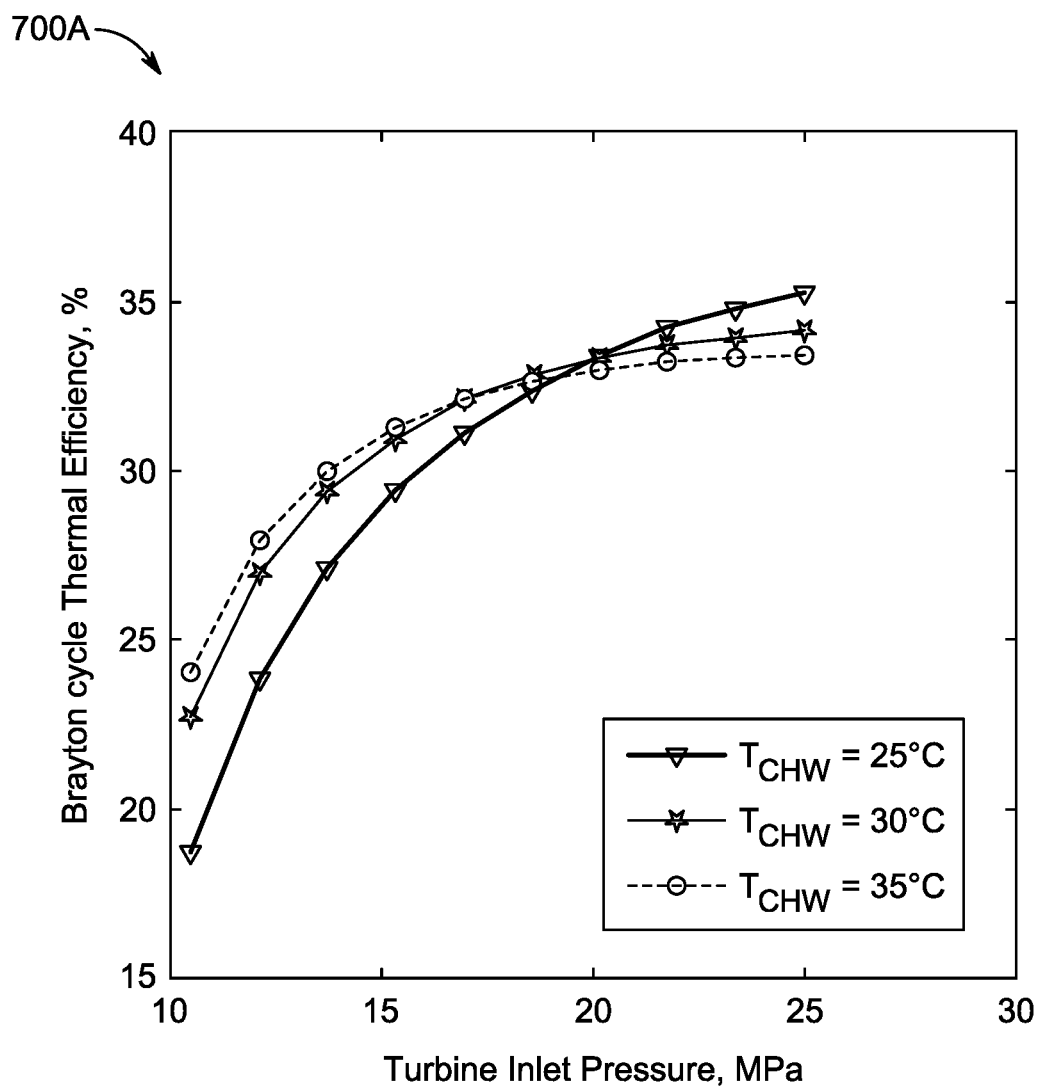
FIG. 7A is an exemplary graphical illustration of effect of chilled water temperature on thermal efficiency of the Brayton cycle system, according to certain embodiments.

Referring to FIG. 7A, an exemplary graphical illustration 700A of effect of chilled water temperature on thermal efficiency of the Brayton cycle system (such as, the Brayton cycle system 102) is illustrated. Referring to FIG. 7B, an exemplary graphical illustration 700B of effect of chilled water temperature on net work output of the Brayton cycle adsorption desalination system (such as the Brayton cycle adsorption desalination systems 100, 200, 300) is illustrated. Referring to FIG. 7C, an exemplary graphical illustration 700° C. of effect of chilled water temperature on heat input of the Brayton cycle adsorption desalination system is illustrated. As may be understood, in a power cycle, lowering the cycle low temperature is a common approach to improving its efficiency. However, the cycle low temperature is constrained by ambient conditions which could be as high as 40° C. in tropical summers. The advantage of synergistically integrating the Brayton cycle system with adsorption desalination system is that the cooling effect produced in the AD system could be used in the Brayton cycle's cooler to achieve a desired compressor inlet temperature. The overall heat rejection for the integrated system occurs at the condenser in the AD cycle. The cooling effect from the AD evaporator does not require additional thermal energy input other than that needed for desalination in the PHE. A parametric analysis was conducted at different chilled water temperatures of 25° C., 30° C., and 35° C. As the AD cycle operating temperatures in evaporator depend on the pressures, the evaporator pressure is also correspondingly decreased to ensure feed seawater evaporation. As a consequence of decreased evaporator operating pressure, the chilled water temperature also decreases. Due to lower chilled water temperatures, the Brayton cycle compressor inlet temperature could be lowered.

Assuming a minimum approach temperature difference ($\Delta T$) of 10° C. for all three chilled water temperatures ($T_{CHW}$) between the compressor inlet (hot) and chilled water inlet to cooler, the impact of chilled water temperature on the cycle performance was studied. This approach temperature difference also ensures that the compressor inlet is in supercritical condition. The results indicate, as depicted in FIGS. 7A-7C, that at a chilled water inlet temperature of 25° C., cycle thermal efficiency reaches its maximum of 35.2% at a pressure of 25 MPa and TIT of 500° C. Considering a base of $T_{CHW}$ of 35° C., the thermal efficiency improved by about 5.6% for a $T_{CHW}$ of 25° C. However, for pressures below 20 MPa, thermal efficiency at 25° C. is lower than the other two. The reason becomes evident looking at the plots of net work output and thermal input to the Brayton cycle in FIGS. 7B and 7C. It is apparent that thermal input for the 25° C. case is higher than the other two cases as the turbine inlet temperature is fixed. Hence, at 25° C., despite higher net work output, the thermal efficiency was lower until a certain Turbine Inlet Pressure (TIP), beyond which better thermal efficiency was observed.

Figures 8A, 8B:
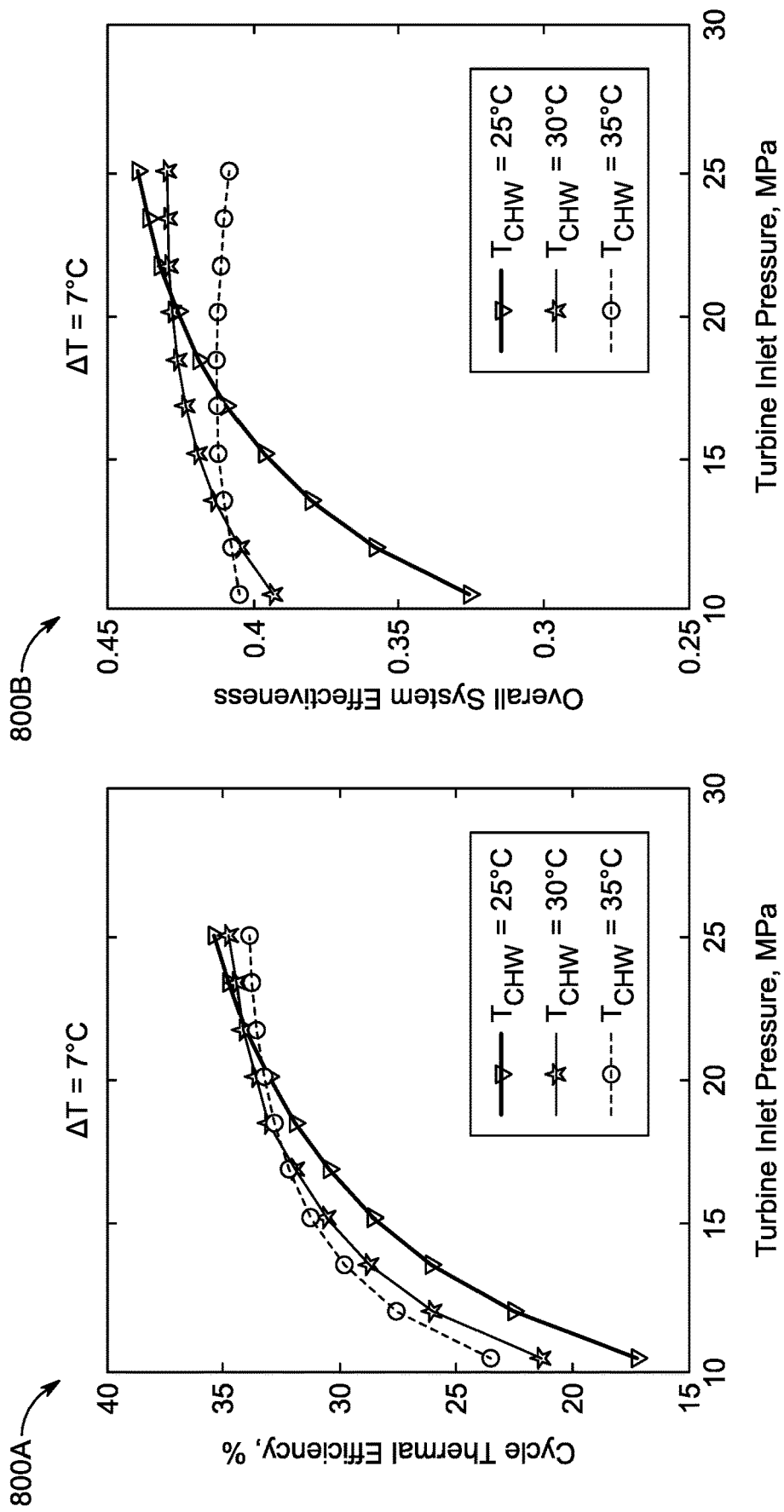
FIG. 8A is an exemplary graphical illustration of effect of cooler approach temperature of 7° C. on thermal efficiency of the Brayton cycle system, according to certain embodiments.
FIG. 8B is an exemplary graphical illustration of effect of cooler approach temperature of 7° C. on overall effectiveness of the Brayton cycle adsorption desalination system, according to certain embodiments.
Figures 8C, 8D:
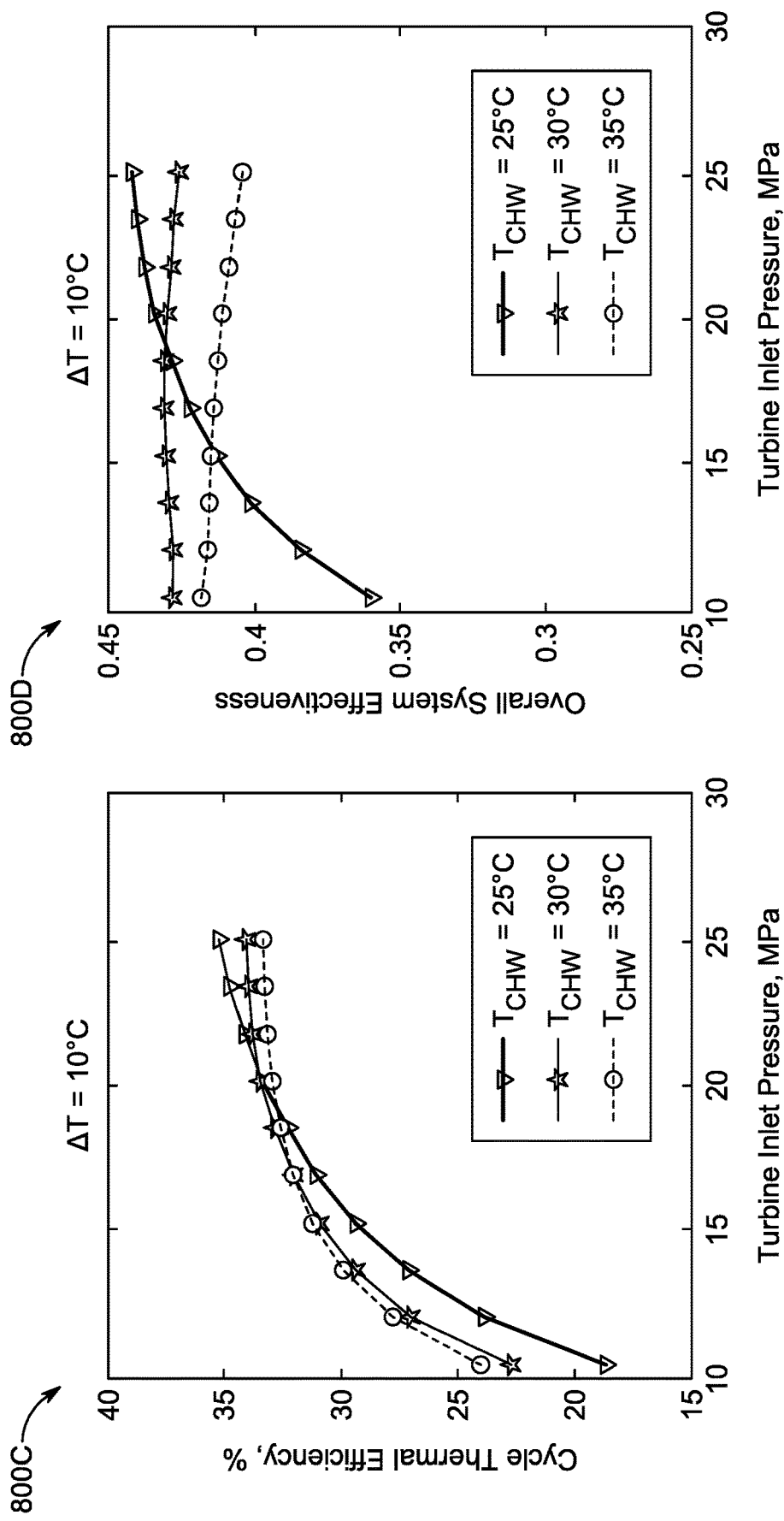
FIG. 8C is an exemplary graphical illustration of effect of cooler approach temperature of 10° C. on thermal efficiency of the Brayton cycle system, according to certain embodiments.
FIG. 8D is an exemplary graphical illustration of effect of cooler approach temperature of 10° C. on overall effectiveness of the Brayton cycle adsorption desalination system, according to certain embodiments.
Figures 8E, 8F:
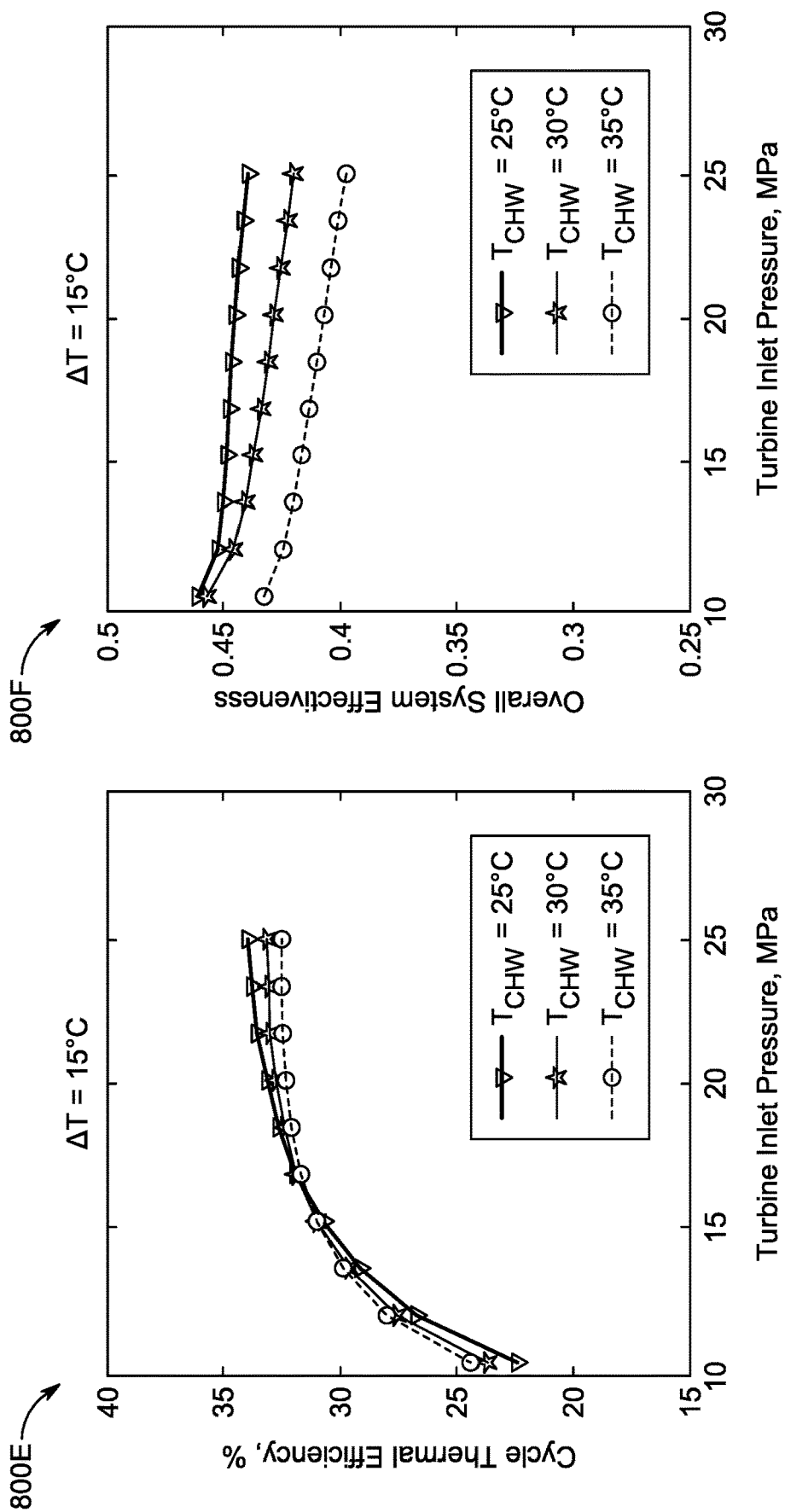
FIG. 8E is an exemplary graphical illustration of effect of cooler approach temperature of 15° C. on thermal efficiency of the Brayton cycle system, according to certain embodiments.
FIG. 8F is an exemplary graphical illustration of effect of cooler approach temperature of 15° C. on overall effectiveness of the Brayton cycle adsorption desalination system, according to certain embodiments.

Referring to FIG. 8A, an exemplary graphical illustration 800A of effect of cooler approach temperature of 7° C. on thermal efficiency of the Brayton cycle system is illustrated. Referring to FIG. 8B, an exemplary graphical illustration 800B of effect of cooler approach temperature of 7° C. on overall effectiveness of the Brayton cycle adsorption desalination system is illustrated. Referring to FIG. 8C, an exemplary graphical illustration 800C of effect of cooler approach temperature of 10° C. on thermal efficiency of the Brayton cycle system is illustrated. Referring to FIG. 8D, an exemplary graphical illustration 800D of effect of cooler approach temperature of 10° C. on overall effectiveness of the Brayton cycle adsorption desalination system is illustrated. Referring to FIG. 8E, an exemplary graphical illustration 800E of effect of cooler approach temperature of 15° C. on thermal efficiency of the Brayton cycle system is illustrated. Referring to FIG. 8F, an exemplary graphical illustration 800F of effect of cooler approach temperature of 15° C. on overall effectiveness of the Brayton cycle adsorption desalination system is illustrated. It is important to understand the degree to which the compressor inlet could be close to the vapor dome from a fluid property perspective. The cooler approach temperature, that is, the temperature difference ($\Delta T_{cooler}$) between the chilled water inlet and $CO_2$ outlet temperature in the cooler is varied between 7° C., 10° C., and 15° C., such that the compressor inlet is always at supercritical conditions. The lowest approach temperature just above the critical point was investigated to understand its impact on cycle performance and coolant temperature rise. Best cycle performance with a $\eta_{BC}$ of 35.4% was observed for $T_{CHW}$=25° C., $\Delta T_{cooler}$=7° C., and at 25 MPa. This maximum performance was an improvement of about 9.1% over $T_{CHW}$ of 35° C. and $\Delta T_{cooler}$=15° C. Lowest $\eta_{BC}$ of 32.5% was observed for the chilled water inlet temperature of 35° C., $\Delta T_{cooler}$=15° C., and at 25 MPa due to higher compressor inlet temperatures. The cycle thermal efficiency and overall system effectiveness trends at different approach $\Delta T_{cooler}$ and chilled water temperatures are shown in FIGS. 8A-8F.

As for overall system effectiveness, it may be understood that the behavior changes due to the desalination and cooling output (normalized by second law efficiency). The heat input, heat recovered, and compressor work in the BC varies significantly as $\Delta T_{cooler}$ changes from 7° C. to 15° C. Therefore, comparison in such cases may be restricted to different chilled water inlet temperatures at same approach temperatures ($\Delta T_{cooler}$). It should be noted that the cooler approach temperatures do not impact desalination or cooling output and only vary depending on the temperature $T_{CHW}$. At lower $T_{CHW}$, higher desalination output was observed due to greater uptake by silica gel and larger pressure difference between evaporator and condenser of the AD system. The maximum overall system effectiveness of 0.439 was achieved at $\Delta T_{cooler}$=7° C., $T_{CHW}$=25° C., and at 25 MPa as seen in FIG. 8A. At approach temperature of $\Delta T_{cooler}$=15° C., the overall system effectiveness exhibits a downward trend as observed in FIGS. 8E and 8F, with the increase in turbine inlet pressure. This significant departure from its behavior at $\Delta T_{cooler}$=7° C. is attributed to the increased compressor work input as a result of increased compressor inlet temperature. The performance of the intermediate $\Delta T_{cooler}$=10° C. is shown in FIGS. 8C and 8D, where the maximum is also observed at $T_{CHW}$=25° C. Further, at a particular $\Delta T_{cooler}$, the cooling and desalination output increases almost twice between the extreme cases of $T_{CHW}$. Also, it is apparent that at higher $\Delta T_{cooler}$, there is a necessary trade-off between Brayton cycle thermal efficiency and the overall system performance. It can be concluded from this analysis that lower $\Delta T_{cooler}$ approaches and chilled water temperatures are favorable for both the Brayton cycle as well as the adsorption desalination.

Figure 9:
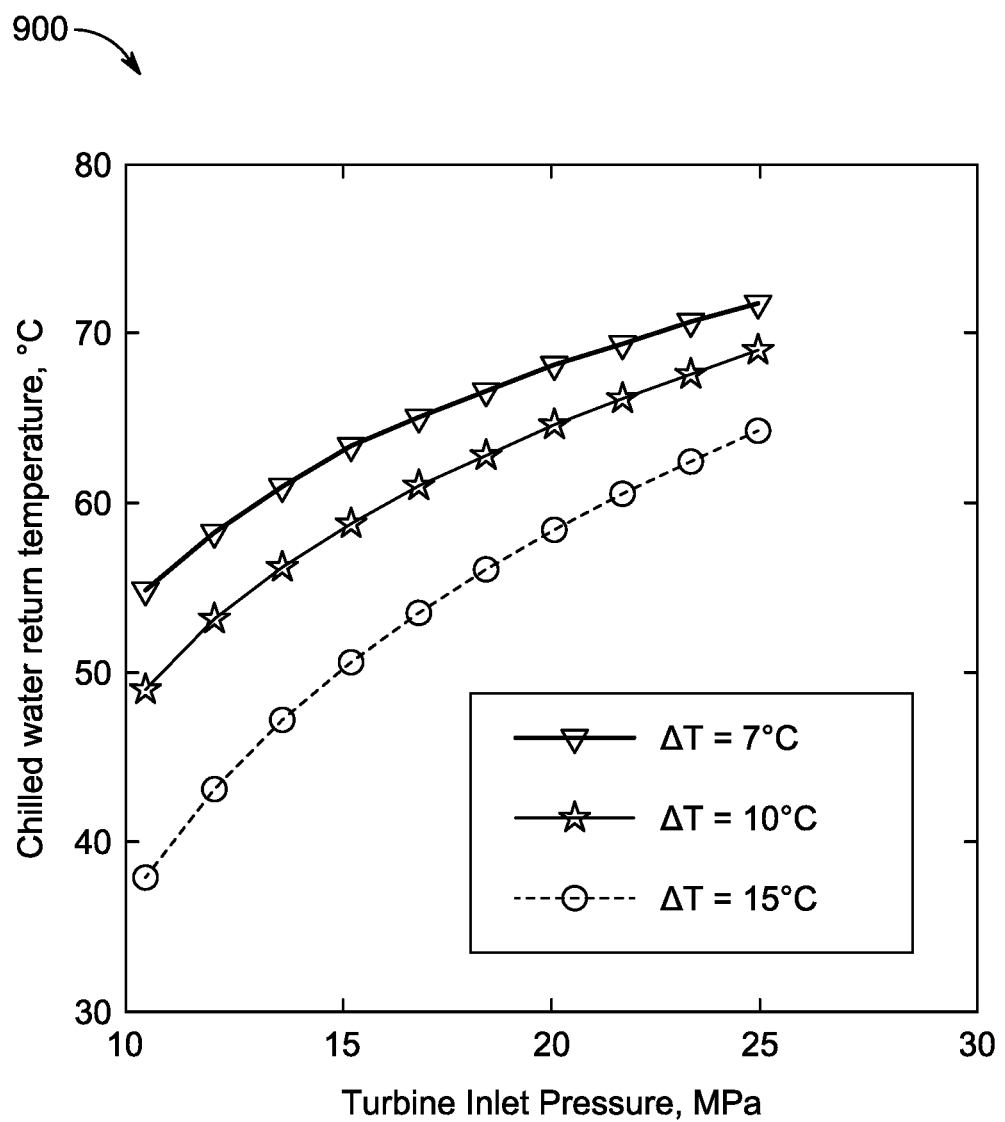
FIG. 9 is an exemplary graphical illustration of effect of properties of working fluid on coolant temperatures, according to certain embodiments.

Referring to FIG. 9, an exemplary graphical illustration 900 of effect of properties of working fluid on coolant temperatures is illustrated. Since the source of the cooling effect in Brayton cycle is internal to the cycle, and hence it is vital to understand the impact of this process on the coolant. Under the best cycle thermal efficiency conditions, that is, at 25° C. chilled water inlet temperature and with a coolant flow rate of 0.4 kg/s, the coolant (chilled water) temperature rise in the cooler was analyzed and was mapped in FIG. 9 for different approach temperatures. At $\Delta T_{cooler}$=7° C., the return water temperature was as high as 72° C., while at $\Delta T_{cooler}$=15° C., it increased up to 65° C. at high turbine inlet pressures. This high return temperature could be attributed to the higher specific heat capacity of the $SCO_2$ at these conditions closer to the dome compared to the coolant (chilled water). If the cycle thermal efficiency and overall system performance is to be maximized, then cycle operation at high turbine inlet pressures is necessary and would result in high chilled water return temperatures. In order to cool down the return stream in this closed-loop, it becomes necessary to employ a cooling tower. The gain in cycle efficiency and overall system effectiveness by about 9.1% and 10.7% respectively between the extreme cases (if the ambient air is at 35° C. in typical tropical conditions) could potentially compensate for this additional system cost. Alternatively, the chilled water flow rate could also be increased to accommodate for lower temperature rise in the cooler with a proportionate scale-up of the AD cycle.

Figure 10A:
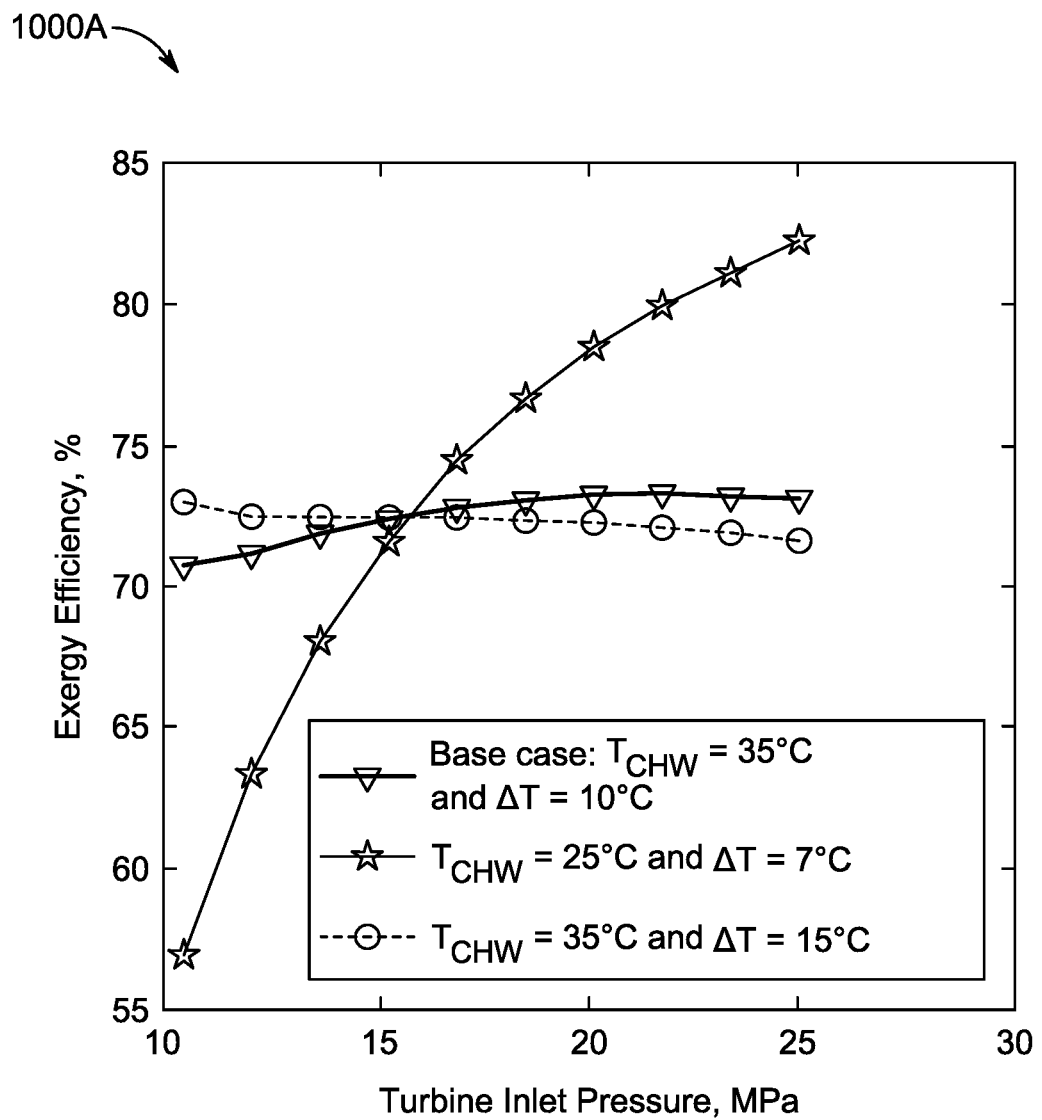
FIG. 10A is an exemplary graphical illustration of impact of different operating conditions on exergy efficiency, according to certain embodiments.
Figure 10C:
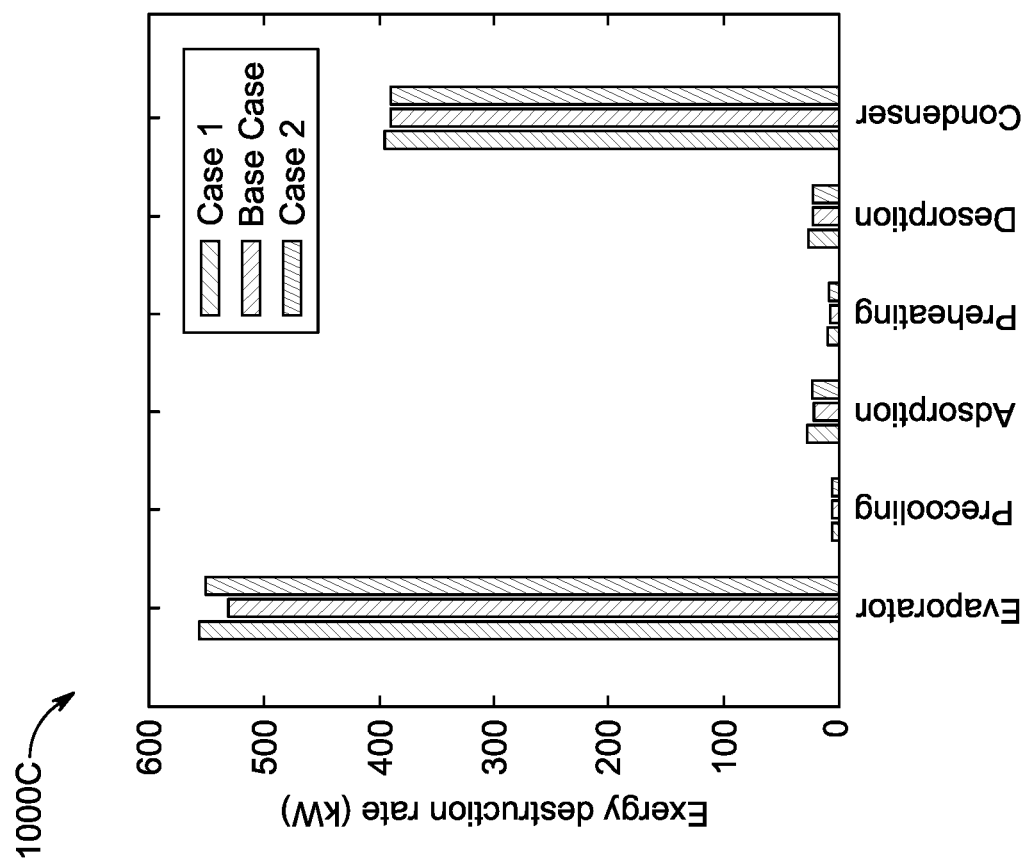
FIG. 10C is an exemplary graphical illustration of exergy destruction rate in the working fluid in the adsorption desalination system, according to certain embodiments.
Figure 10B:
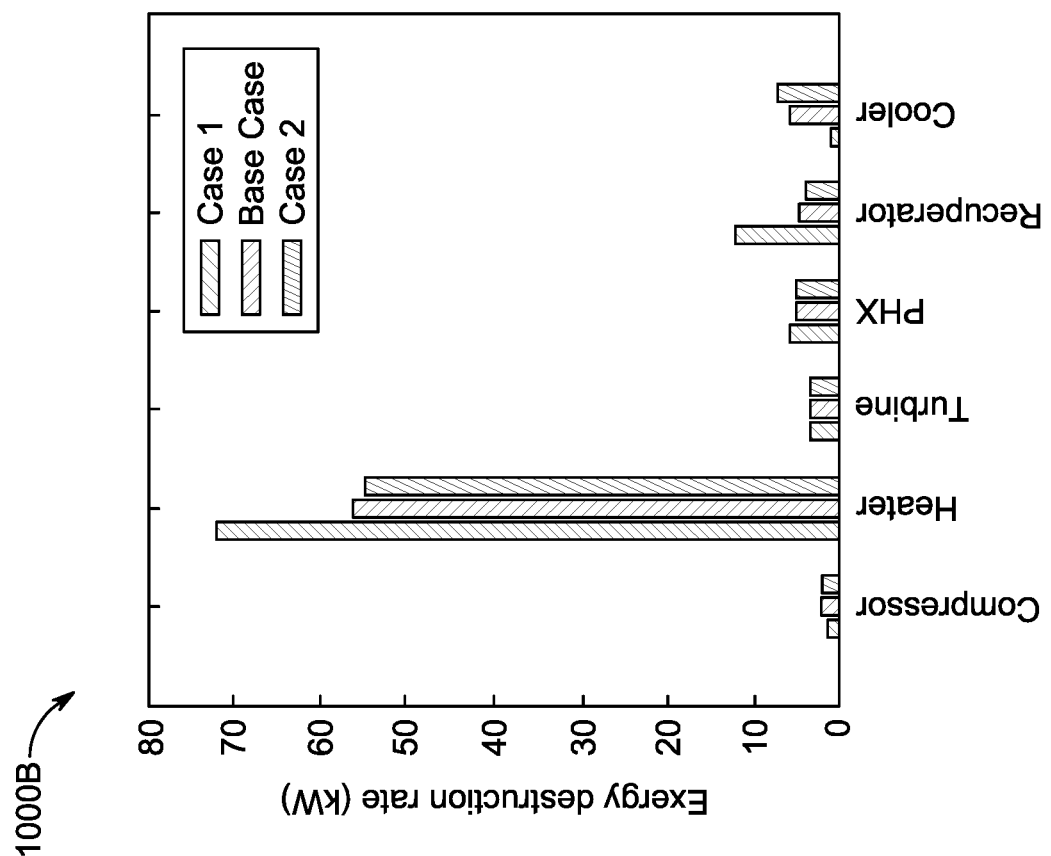
FIG. 10B is an exemplary graphical illustration of exergy destruction rate in the working fluid in the Brayton cycle system, according to certain embodiments.

Referring to FIG. 10A, an exemplary graphical illustration 1000A of impact of different operating conditions on exergy efficiency is illustrated. Referring to FIG. 10B, an exemplary graphical illustration 1000B of exergy destruction rate in the working fluid in the Brayton cycle system is illustrated. Referring to FIG. 10C, an exemplary graphical illustration 1000C of exergy destruction rate in the working fluid in the adsorption desalination system is illustrated. Herein, exergy destruction rate and exergy efficiency was analyzed for the integrated system under three different operating conditions. The Base Case of chilled water inlet temperature at 35° C. and approach temperature of 10° C. represents typical ambient conditions, while the Case 1 ($T_{CHW}$=25° C. and $\Delta T$=7° C.) and ($T_{CHW}$=35° C. and $\Delta T$=15° C.) were modeled to depict extreme performance effects. Between the Case 1 and base scenarios, the exergy efficiency improves by about 13% indicating better performance potential with lower chilled water or coolant temperatures in the Brayton cycle. Case 1 exergy efficiency improves by 15% over the Case 2 operating conditions. A maximum exergy efficiency of 82.1% was observed for Case 1, an indication of better system quality. The exergy efficiency of these scenarios are shown in FIG. 10A.

Further, in the SREBC, maximum exergy destruction was observed in the heater due to heat input in both cases. Case 1 exhibits more exergy destruction in the heater, PHE, and recuperator compared to Case 2 due to heat transfer with the source, sink, or internally. This could be attributed to lower compressor inlet temperature in Case 1 ($T_1$=32° C.) and thereby more heat input to reach a desired turbine inlet temperature of 500° C. This could also be corroborated from FIG. 10B with a gradual increase in exergy destruction with increase in compressor inlet temperature for different cases. In the Brayton cycle cooler, there is a significant decrease of 89% in the exergy destruction for Case 1 compared to the Case 2. This behavior could be due to higher specific heat capacities of the $SCO_2$ in Case 1 with lower compressor inlet temperatures which leads to a smaller temperature drop. Hence, the exergy destruction rate is also lower for Case 1 in the cooler. The Base Case rates predominantly lie in between these two cases as expected.

Further, the changes in the chilled water temperature at the evaporator impacts heat transfer across the major components of AD cycle. Hence, the exergy destruction analysis is necessary for better understanding the process. Major exergy destruction rates (about 90%) are observed at the evaporator and condenser. One apparent reason for this behavior is phase change resulting in higher irreversibility losses. Further, the heat exchange in the evaporator occurs between the chilled water and fresh sea or brackish water. Seawater properties such as entropy and saturation pressures are significantly different from that of the pure chilled water liquid. This contributes to higher exergy destruction. Hence, the exergy destruction rate is very similar in all studied cases. In the condenser, the water vapor at about 85° C. condenses by heat rejection to ambient and the exergy destruction is higher due to this phase change. Furthermore, it can also be seen from FIG. 10C that the exergy destruction rate is significantly higher in adsorption desalination compared to Brayton cycle due to several phase change process to produce fresh water.

Figure 11B:
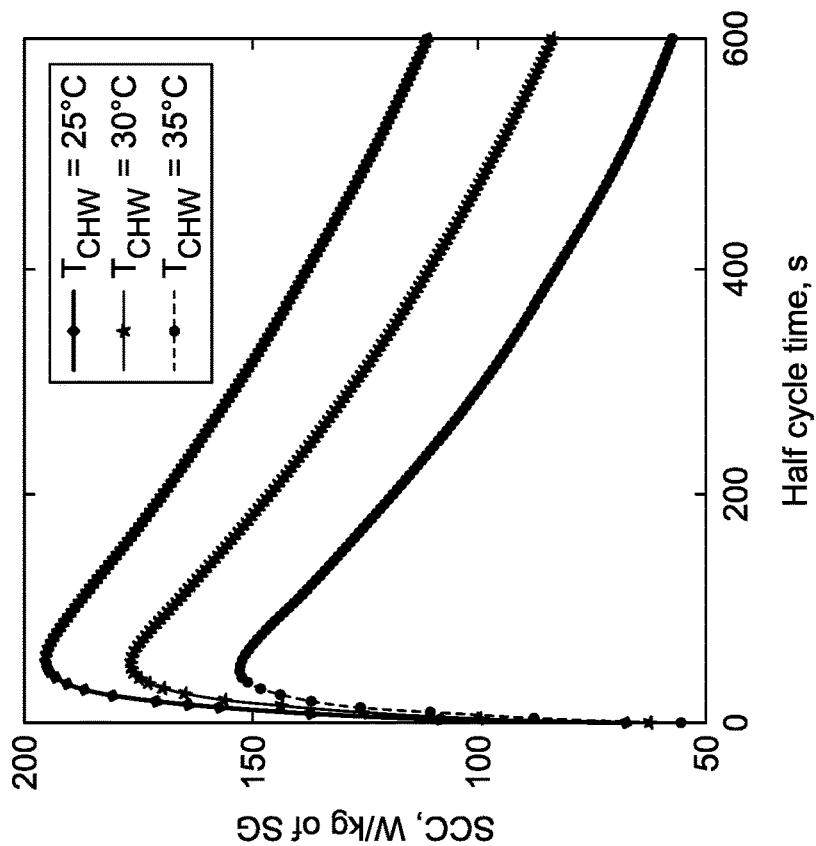
FIG. 11B is an exemplary graphical illustration of effect of different operating temperatures of evaporator on Specific Cooling Capacity (SCC), according to certain embodiments.
Figure 11A:
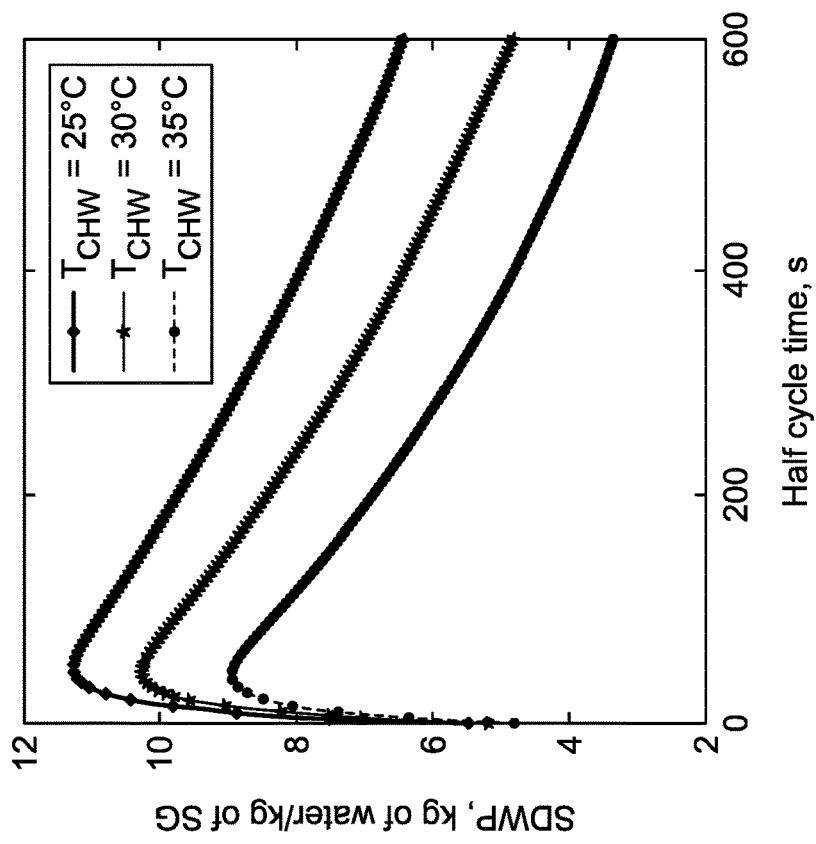
FIG. 11A is an exemplary graphical illustration of effect of different operating temperatures of evaporator on Specific Daily Water Production (SDWP), according to certain embodiments.
Figure 11C:
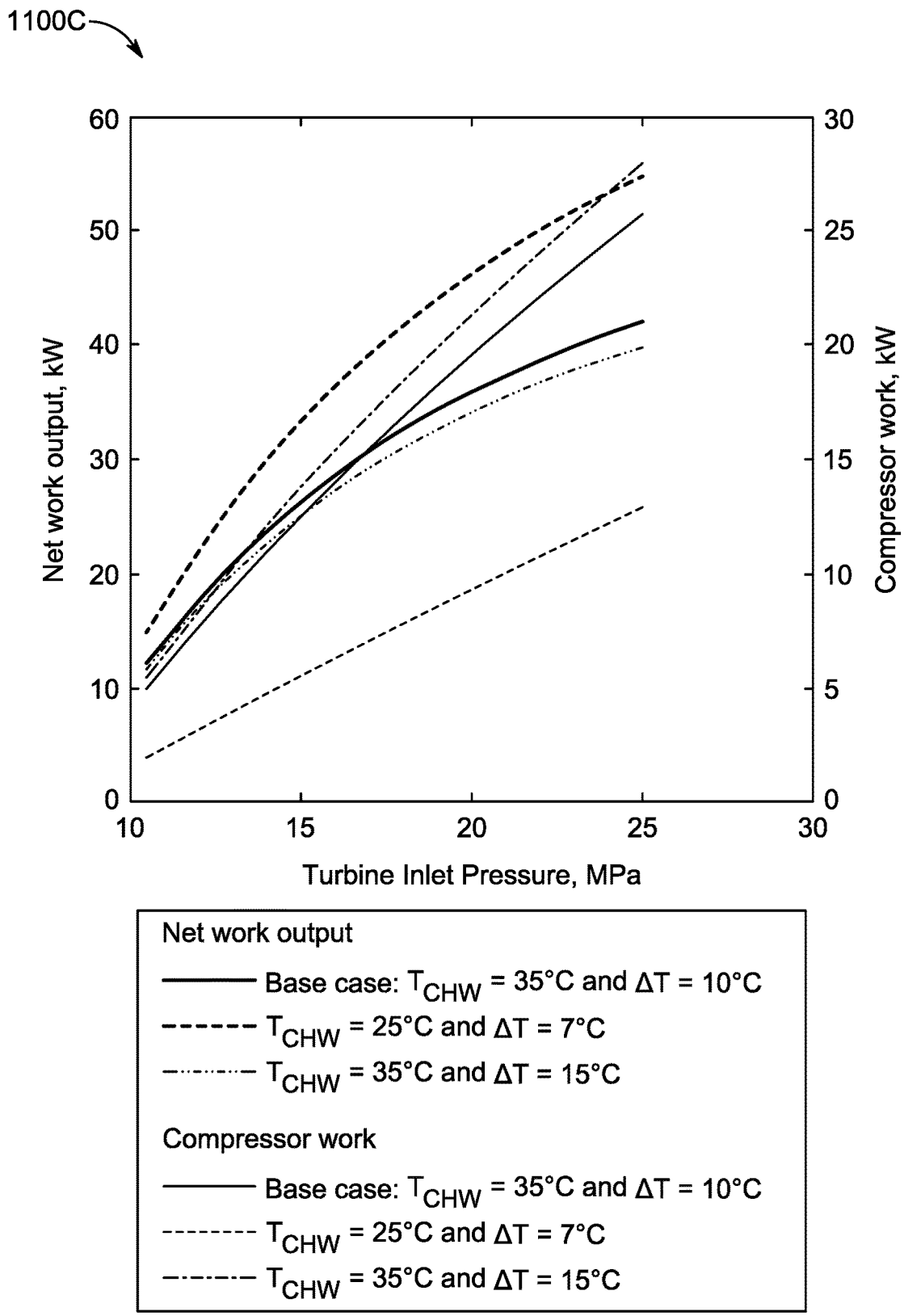
FIG. 11C is an exemplary graphical illustration of net work output and compressor work from the Brayton cycle adsorption desalination system, according to certain embodiments.

Referring to FIG. 11A, an exemplary graphical illustration 1100A of effect of different operating temperatures of evaporator on Specific Daily Water Production (SDWP) is illustrated. Referring to FIG. 11B, an exemplary graphical illustration 1100B of effect of different operating temperatures of evaporator on Specific Cooling Capacity (SCC) is illustrated. Referring to FIG. 11C, an exemplary graphical illustration 1100C of net work output and compressor work from the Brayton cycle adsorption desalination system is illustrated. Herein, desalination from the AD cycle could be quantified using SDWP or heat rejected at the condenser ($Q_{cond}$). Conventionally, researchers have reported using the former parameter normalized to the mass of the adsorbent. Cooling from the AD cycle was quantified using specific cooling output (SCC), which is also normalized to the adsorbent mass. AD cycle outputs are dependent broadly on the evaporator and condenser operating temperatures and pressures. Herein, the impact of varying chilled water or adsorption temperatures on desalination and cooling was analyzed. A single-stage two-bed configuration using silica gel as adsorbent and heat input temperature at 85° C. was studied. At $T_{CHW}$ of 25° C., a maximum SDWP of 11.3 kg per kg of silica gel (SG) and a maximum SCC of 195 W per kg of SG were observed. These peaks were 26% and 28% respective output improvement compared to that at $T_{CHW}$ of 35° C. This concurs with the knowledge that the adsorption capacity of the silica gel increases with a decrease in the adsorption temperatures. The peak was obtained at a half cycle time of about 110-120 seconds and decreases beyond this peak for the rest of the cycle. This behavior could be attributed to the bed's thermal mass or the adsorbent's saturation limit. It is very evident from this analysis that there is a significant advantage operate the AD cycle at low temperatures for improved desalination output as well.

Further, the net power output from the integrated cycle with a working fluid mass flow rate of 0.5 kg/s was modeled at a turbine inlet temperature of 500° C. and at various turbine inlet pressures. It can be seen from FIG. 11C that the maximum output of about 55 kW was achieved at a turbine inlet pressure of 25 MPa and at conditions of $T_{CHW}$=25° C. and $\Delta T_{cooler}$=7° C. Herein, the compressor work also follows the same trend as that of the net work output from the system with respect to the turbine inlet pressure. Also, the compressor work also increases due to lower $SCO_2$ densities with the increase in the compressor inlet temperature.

Figure 12A:
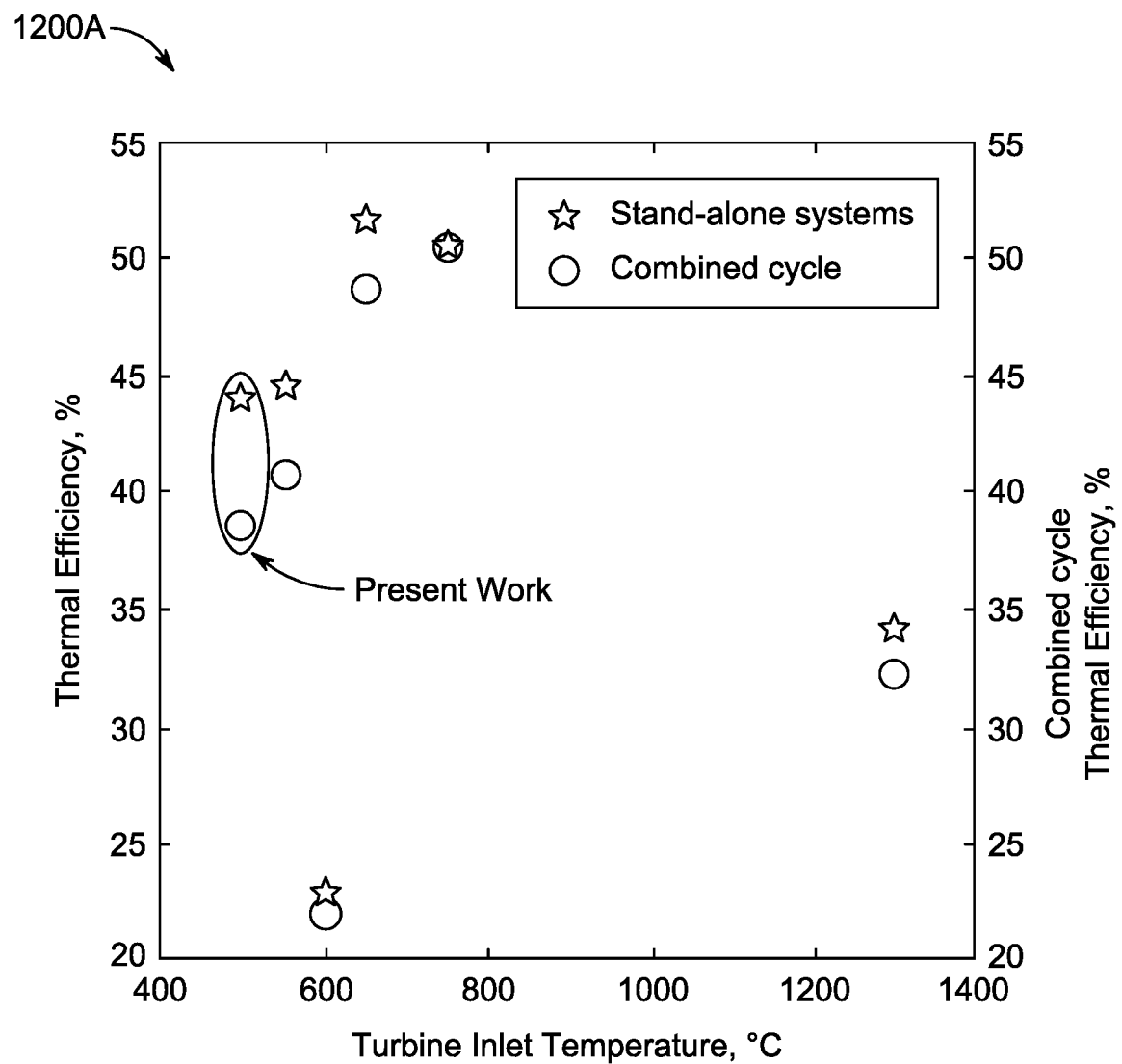
FIG. 12A is an exemplary graphical illustration of performance of the Brayton cycle adsorption desalination system compared with stand-alone systems by its energy efficiency, according to certain embodiments.
Figure 12B:
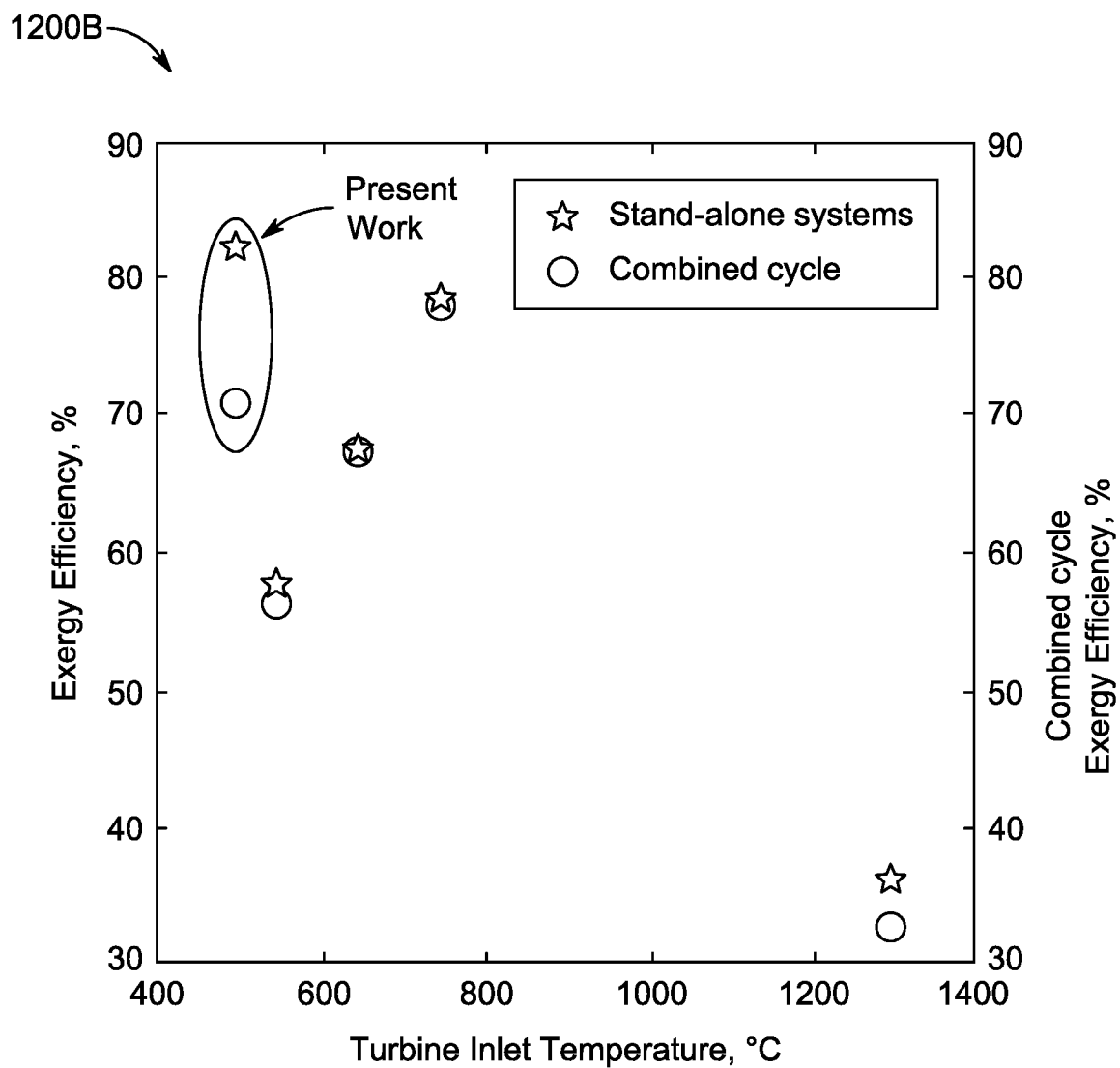
FIG. 12B is an exemplary graphical illustration of performance of the Brayton cycle adsorption desalination system compared with stand-alone systems by its exergy efficiency, according to certain embodiments.
Figure 12C:
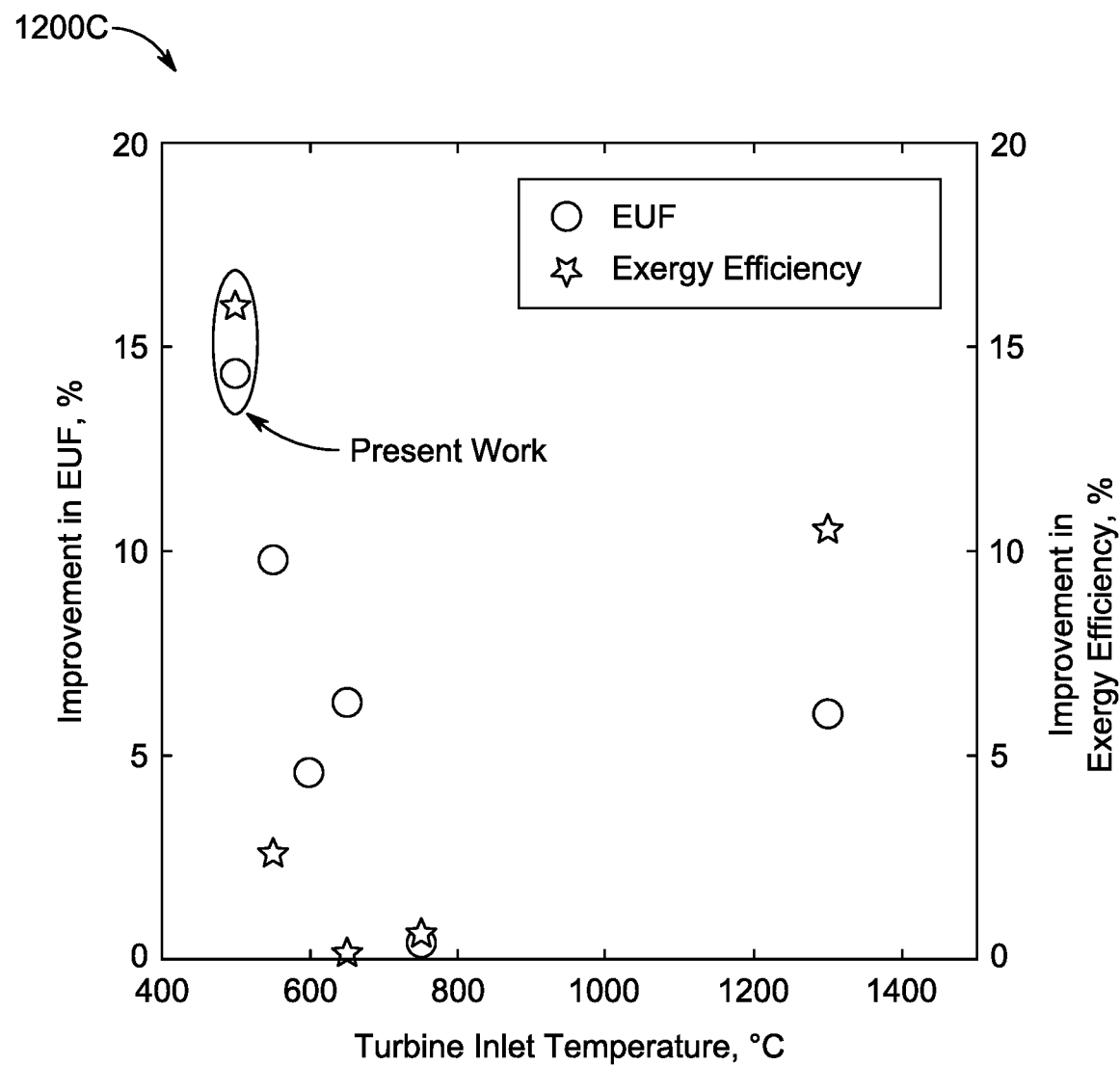
FIG. 12C is an exemplary graphical illustration of performance improvement in Energy Utilization Index (EUI) and exergy efficiency of the Brayton cycle adsorption desalination system compared with stand-alone systems, according to certain embodiments.

Referring to FIG. 12A, an exemplary graphical illustration 1200A of performance of the Brayton cycle adsorption desalination system compared with stand-alone systems by its energy efficiency is illustrated. Referring to FIG. 12B, an exemplary graphical illustration 1200B of performance of the Brayton cycle adsorption desalination system compared with stand-alone systems by its exergy efficiency is illustrated. Referring to FIG. 12C, an exemplary graphical illustration 1200C of performance improvement in Energy Utilization Index (EUI) and exergy efficiency of the Brayton cycle adsorption desalination system compared with stand-alone systems is illustrated. Herein, the performance comparison was made at an ambient or coolant temperature of 7° C. for all the stand-alone systems, where multi-effect desalination is used for fresh water. From FIGS. 12A and 12B, it may be observed that the integrated $SCO_2$ Brayton cycle system with adsorption desalination system has a greater performance improvement over a stand-alone system in both energy and exergy efficiencies. It may be noted that the turbine inlet temperatures were also higher which contributes to greater work output. Despite lower TIT, the present integrated system has shown an improvement of about 14.2% in thermal efficiency. The exergy efficiency is also much higher at about 80% which indicates better usage of energy within the system and its quality. It may be noted that the cooling output results in the literature compared here was converted to work using a typical practical Coefficient of Performance (COP) value of 3. The performance improvement of present disclosure was compared with the literature using overall system effectiveness and exergy efficiency. From FIG. 12C, it is evident that the integrated system of SREBC with Adsorption desalination achieved the highest improvement of 14.3% and 15.9% in overall system effectiveness and exergy efficiency, respectively. Further, it should also be noted that most literature works compared here employed the more efficient recompression Brayton cycle in contrast to the recuperative configuration in this integration. This performance improvement corroborates that less energy-intensive adsorption desalination cycle can be integrated with supercritical Brayton cycle efficiently for cogeneration applications.

Therefore, it may be concluded that at the lowest chilled water temperature ($T_{CHW}$) of 25° C. and lowest approach $\Delta T_{cooler}$ of 7° C., the Brayton cycle energy efficiency and overall system effectiveness improved by over 6.2% and 8.8% respectively, over a Base Case with a $T_{CHW}$ of 35° C. and a $\Delta T$ of 10° C., representative of typical ambient conditions in tropical countries. Further, the impact of lowering compressor inlet temperature on the Brayton cycle and the coolant return temperatures were investigated. At $T_{CHW}$=25° C. and lowest approach $\Delta T$ of 7° C., the coolant return temperature was as high as 72° C. with potential thermal efficiency and overall system effectiveness improvements of over 9% against the extreme ambient case. Also, exergy destruction rate of the integrated cycle was analyzed to identify components with higher destruction. With operating conditions of $T_{CHW}$=25° C. and an approach $\Delta T$ of 7° C., the exergy destruction rate decreased by about 90% compared to the extreme case ($T_{CHW}$=35° C. and approach $\Delta T$ of 15° C.).

Obviously, numerous modifications and variations of the present disclosure are possible in light of the above teachings. It is therefore to be understood that within the scope of the appended claims, the invention may be practiced otherwise than as specifically described herein.

The invention claimed is:

1. A Brayton cycle adsorption desalination system, comprising:
   an adsorption desalination system comprising an evaporator for evaporating saline water to obtain water vapor, an adsorbent bed for adsorbing and desorbing the water vapor, and a condenser for condensing the water vapor to obtain distilled water; and
   a Brayton cycle system comprising a primary heat exchanger (PHE) and a cooler configured to cool an exhaust from the PHE,
   wherein the Brayton cycle system and the adsorption desalination system are connected at the PHE so that the PHE is configured to function as a heat source for the adsorbent bed, and
   the Brayton cycle system and the adsorption desalination system are connected at the cooler so that the evaporator is configured to absorb heat rejected from the cooler.

2. The Brayton cycle adsorption desalination system of claim 1,
   wherein the Brayton cycle system further comprises:
   a compressor that compresses a working fluid from a low pressure to a high pressure;
   a recuperator that pre-heats the working fluid to obtain a pre-heated working fluid;
   a heater that heats the pre-heated working fluid to obtain a heated working fluid; and
   a turbine through which the heated working fluid passes such that the heated working fluid expands to output work and obtain an expanded working fluid,
   wherein the expanded working fluid passes through the PHE to obtain the exhaust.

3. The Brayton cycle adsorption desalination system of claim 2, wherein the compressor, the recuperator, the heater, the turbine, the PHE, and the cooler are configured to define a closed path cycle for the working fluid, wherein:
   an outlet of the compressor is connected to a first inlet of the recuperator,
   a first outlet of the recuperator is connected to an inlet of the heater,
   an outlet of the heater is connected to an inlet of the turbine,
   an outlet of the turbine is connected to an inlet of the PHE,
   an outlet of the PHE is connected to a second inlet of the recuperator,
   a second outlet of the recuperator is connected to an inlet of the cooler, and
   an outlet of the cooler is connected to an inlet of the compressor.

4. The Brayton cycle adsorption desalination system of claim 3, wherein:
   the recuperator comprises a heat exchanger for a compressed working fluid from the compressor and the exhaust from the PHE to exchange heat.

5. The Brayton cycle adsorption desalination system of claim 1, wherein the adsorption desalination system comprises:
   two or more adsorbent beds that operate in an alternate sequence of adsorption and desorption modes, and
   a switching valve configured to control the alternate sequence of adsorption and desorption modes.

6. The Brayton cycle adsorption desalination system of claim 1, further comprising a storage tank such that the storage tank, the PHE and the adsorbent bed are configured to define a closed path cycle for a heat transfer medium, wherein:
   an outlet of the storage tank is connected to an inlet of the PHE,
   an outlet of the PHE is connected to an inlet of the adsorbent bed, and
   an outlet of the adsorbent bed is connected to an inlet of the storage tank.

7. The Brayton cycle adsorption desalination system of claim 1, wherein the PHE and the adsorbent bed are in direct contact for heat exchange.

8. The Brayton cycle adsorption desalination system of claim 1, further comprising a coolant storage tank such that the coolant storage tank, the cooler and the evaporator are configured to define a closed path cycle for a coolant, wherein:
   an outlet of the coolant storage tank is connected to an inlet of the cooler,
   an outlet of the cooler is connected to an inlet of the evaporator, and
   an outlet of the evaporator is connected to an inlet of the coolant storage tank.

9. The Brayton cycle adsorption desalination system of claim 1, wherein the evaporator and the cooler are in direct contact for heat exchange.

10. The Brayton cycle adsorption desalination system of claim 2, wherein the working fluid comprises supercritical carbon dioxide.

11. The Brayton cycle adsorption desalination system of claim 1, wherein the adsorbent bed comprises silica gel for adsorbing and desorbing water vapor.

\* \* \* \* \*

UNITED STATES PATENT AND TRADEMARK OFFICE
CERTIFICATE OF CORRECTION

| | | |
|---|---|---|
| PATENT NO. | : 11,311,818 B1 | Page 1 of 1 |
| APPLICATION NO. | : 17/487252 | |
| DATED | : April 26, 2022 | |
| INVENTOR(S) | : Eydhah Almatrafi et al. | |

It is certified that error appears in the above-identified patent and that said Letters Patent is hereby corrected as shown below:

On the Title Page

Item (72), the first inventor's city of residence, "Eydhah Almatrafi, Makkah (SA)" should read
-- Eydhah Almatrafi, Jeddah (SA) --.

Signed and Sealed this
Sixteenth Day of August, 2022

Katherine Kelly Vidal
*Director of the United States Patent and Trademark Office*